United States Patent
Mcilvain et al.

(10) Patent No.: US 7,578,505 B2
(45) Date of Patent: Aug. 25, 2009

(54) ELECTRONIC GAME DEVICE WITH HAND AND FOOT CONTROLS

(75) Inventors: Scott H. Mcilvain, Holland, NY (US); Kristy L. Messing, Wilson, NY (US)

(73) Assignee: Mattel, Inc., El Segundo, CA (US)

( * ) Notice: Subject to any disclaimer, the term of this patent is extended or adjusted under 35 U.S.C. 154(b) by 394 days.

(21) Appl. No.: 11/338,899

(22) Filed: Jan. 25, 2006

(65) Prior Publication Data
US 2007/0173304 A1    Jul. 26, 2007

(51) Int. Cl.
*A63F 7/00* (2006.01)
*A63B 24/00* (2006.01)

(52) U.S. Cl. .............................. 273/126; 463/4; 463/7; 463/36

(58) Field of Classification Search .................. 463/36; 273/148 B; 715/782
See application file for complete search history.

(56) References Cited

U.S. PATENT DOCUMENTS

| | | | |
|---|---|---|---|
| 3,556,525 A | 1/1971 | Pegg | |
| 4,017,075 A | 4/1977 | Wilson | |
| 4,093,223 A | 6/1978 | Wilke et al. | |
| 4,117,606 A | 10/1978 | Pundt | |
| 4,249,734 A | 2/1981 | Bromley | |
| 4,249,735 A | 2/1981 | Bromley | |
| 4,249,744 A | 2/1981 | Bromley | |
| 4,304,404 A | 12/1981 | Pundt | |
| 4,327,915 A | 5/1982 | Bromley | |
| 4,366,960 A | 1/1983 | Bromley et al. | |
| 4,488,017 A | 12/1984 | Lee | |
| 4,582,323 A * | 4/1986 | Minkoff et al. ................. | 463/4 |
| 4,720,789 A | 1/1988 | Hector et al. | |
| D312,280 S | 11/1990 | Kim | |
| 5,074,557 A | 12/1991 | Broussard, Sr. | |
| 5,076,584 A * | 12/1991 | Openiano ..................... | 463/36 |
| 5,139,261 A * | 8/1992 | Openiano ..................... | 463/36 |
| 5,442,168 A * | 8/1995 | Gurner et al. ................. | 463/36 |
| 5,702,305 A * | 12/1997 | Norman et al. ............... | 463/42 |
| 5,976,018 A | 11/1999 | Druckman | |
| 6,110,073 A | 8/2000 | Saur et al. | |

(Continued)

FOREIGN PATENT DOCUMENTS

WO    02/20110 A1    3/2002

*Primary Examiner*—John M Hotaling, II
*Assistant Examiner*—Masud Ahmed
(74) *Attorney, Agent, or Firm*—Edell, Shapiro & Finnan LLC

(57) ABSTRACT

An electronic game device is disclosed that can simultaneously engage at least two players each at a user position arranged on opposite ends or sides of a display device so that the players are facing each other. At each user position there are hand controls such as buttons, joystick, etc., and foot controls such as a footpad having electronic switches formed therein. A controller is connected to the hand controls and foot controls at each user position and to the display device. User actuation of the hand controls produces first game control signals and user actuation of the foot controls produces second game control signals. The controller is responsive to the first game control signals and the second game control signals to generate display control signals coupled to the display device to change the display of game characters and/or objects associated with a game. In addition, the controller may generate audio control signals that are supplied to a speaker.

23 Claims, 20 Drawing Sheets

U.S. PATENT DOCUMENTS

| | | |
|---|---|---|
| 6,176,780 B1 | 1/2001 | Miyamoto et al. |
| 6,227,968 B1 * | 5/2001 | Suzuki et al. .................. 463/7 |
| 6,329,620 B1 | 12/2001 | Oishi et al. |
| 6,450,886 B1 * | 9/2002 | Oishi et al. .................. 463/36 |
| 6,682,070 B1 | 1/2004 | Rosenfeld et al. |
| 2001/0014620 A1 * | 8/2001 | Nobe et al. .................... 463/7 |
| 2001/0016510 A1 * | 8/2001 | Ishikawa et al. ............... 463/7 |
| 2002/0183104 A1 | 12/2002 | Takemoto et al. |
| 2002/0193156 A1 | 12/2002 | Nishimura |
| 2004/0070625 A1 * | 4/2004 | Palombo et al. ............. 345/782 |
| 2007/0072662 A1 * | 3/2007 | Templeman .................. 463/6 |

* cited by examiner

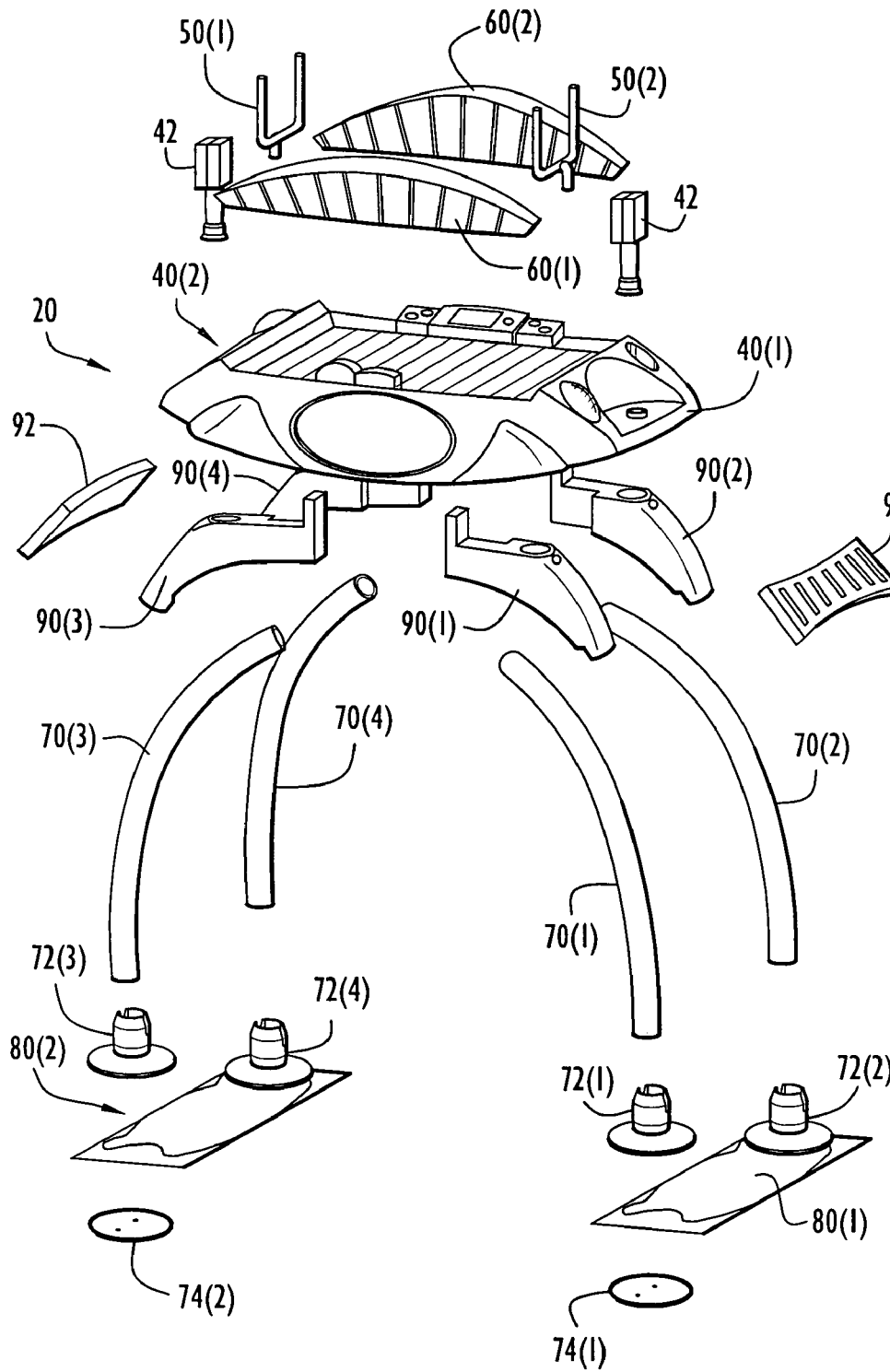

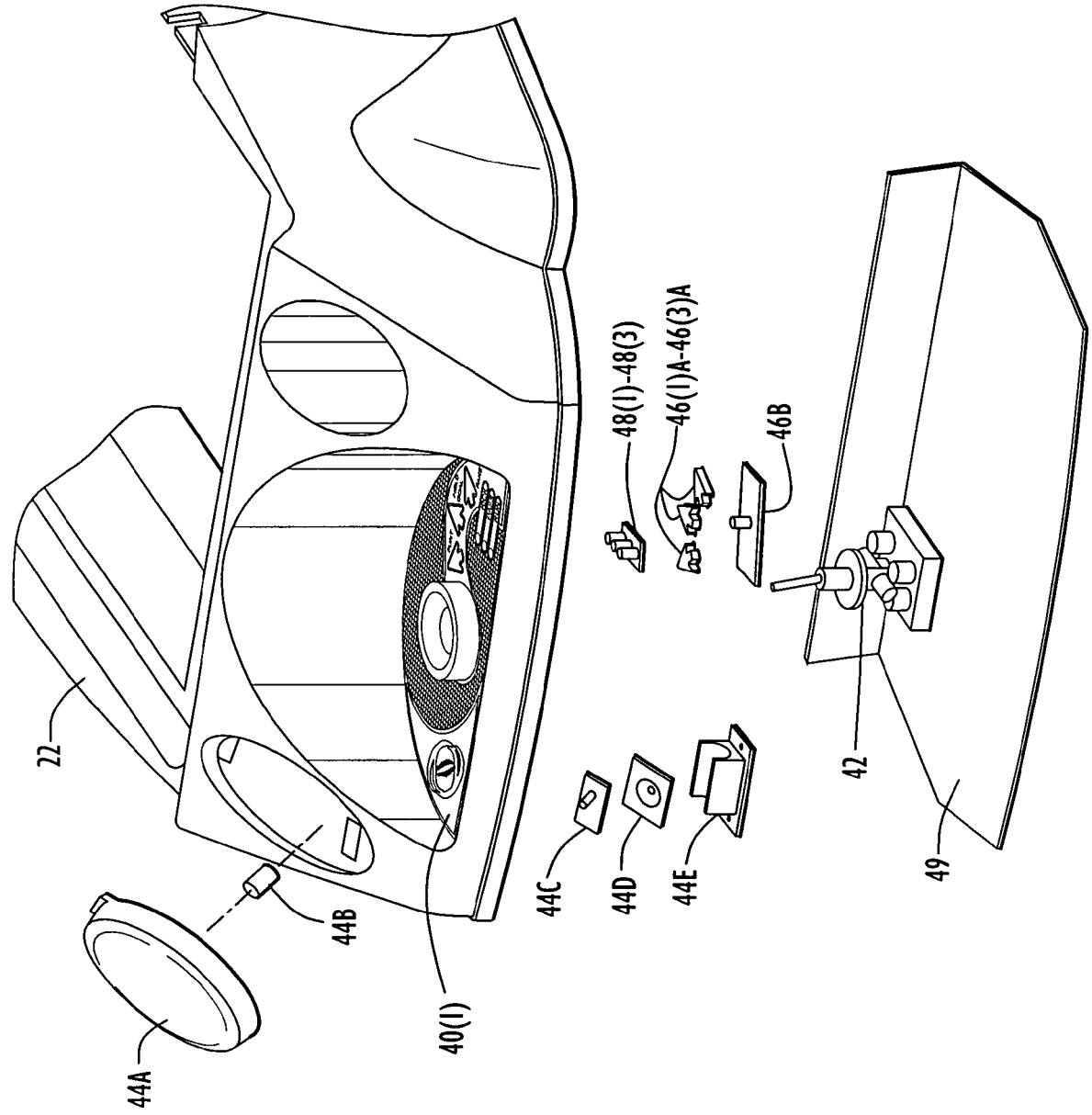

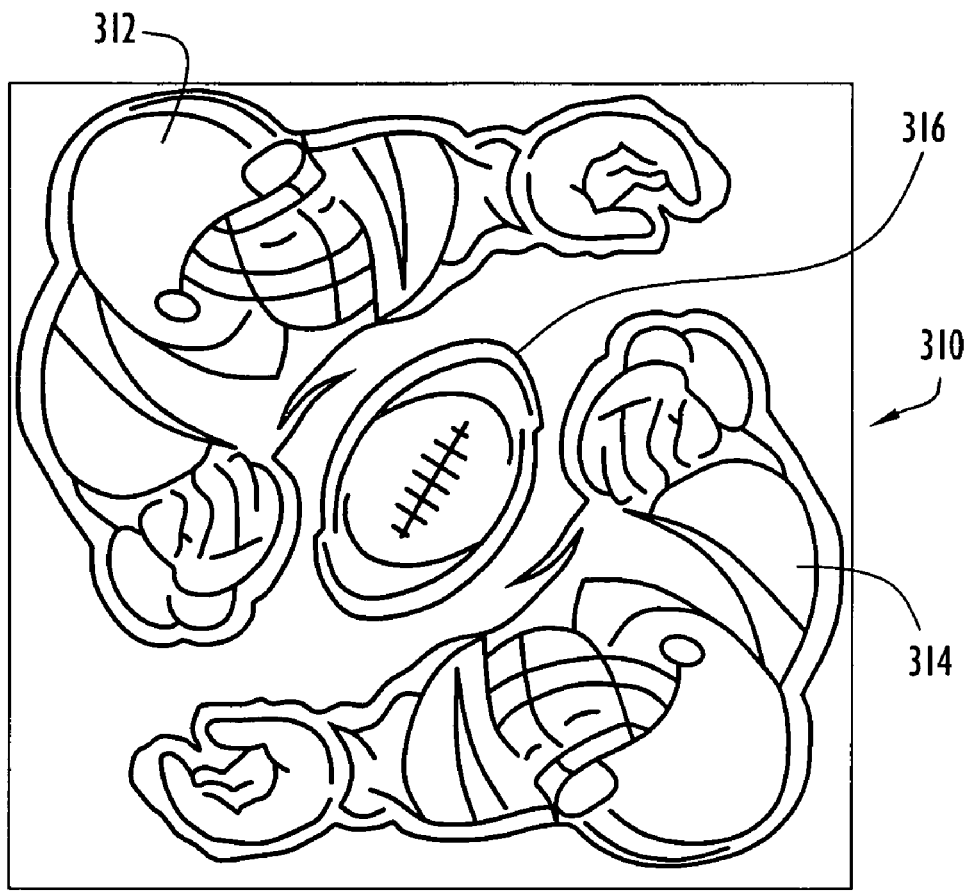
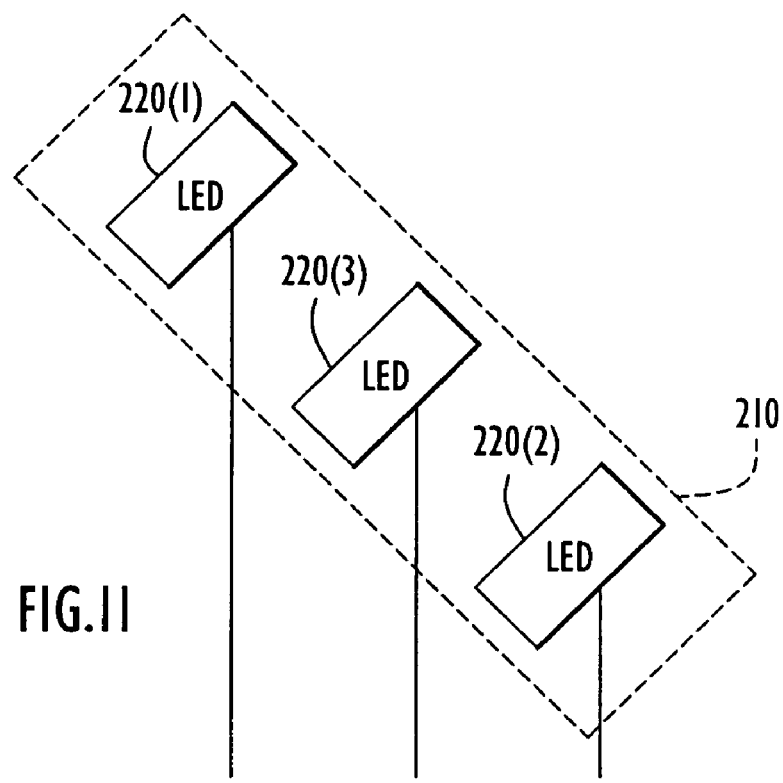
FIG. 11

ELECTRONIC GAME DEVICE WITH HAND AND FOOT CONTROLS

BACKGROUND OF THE INVENTION

Many electronic game devices are available that engage users in various games in hand-held or larger freestanding platforms. Some electronic game devices are based on original game concepts while others are based on and simulate popular preexisting games or sports such as basketball, football, tennis, golf, etc.

Electronic game devices are often designed to be played by a single player or user at a time. In addition, most electronic game devices heretofore known employ only hand controls such as a joystick, mouse, buttons, etc. Electronic games that simulate a sport activity would be more realistic, challenging and interesting if there are both hand controls and foot controls for a user of the device.

It is desirable to provide an electronic game device that simultaneously engages two players and that uses hand controls and foot controls arranged with respect to a display so that the players are facing each other while interacting with the game device.

SUMMARY OF THE INVENTION

Briefly, the present invention is directed to an electronic game device that can simultaneously engage at least two players, each at a user position arranged on opposite ends or sides of a display device so that the players are facing each other. At each user position there are hand controls such as buttons, joystick, etc., and foot controls such as a footpad having electronic switches formed therein. For example, the footpad may have a pair of electronic switches, each responsive to impact of a foot of a user to simulate a walking or running motion. A system controller is connected to the hand controls and foot controls at each user position and to the display device. User actuation of the hand controls produces first game control signals and user actuation of the foot controls produces second game control signals. The system controller of the present invention is responsive to the first game control signals and second game control signals to generate display control signals coupled to the display device to change the display of game characters and/or objects associated with a game. In addition, the system controller may generate audio control signals that are supplied to a speaker.

The display device of the present invention may take on a variety of forms, but in one embodiment, the display comprises an array of light emitting diodes (LEDs) positioned beneath a printed screen containing artwork for an array of game characters and objects. The LEDs function to shine light through various portions of the printed screen. The system controller selectively activates and deactivates the LEDs to create the visual appearance of game characters and/or the game object moving on the display surface (stylized as a playing field) in response to user actuation of hand and foot controls.

In an exemplary embodiment described herein, the game device of the present invention simulates an American style football game. Each player uses both hands and feet to control movement of a game character during play of the game. The system controller executes game logic that, depending on the playing mode, allows each player to select offensive and defensive plays, or automatically selects the plays, and displays the status of the game, thereby realistically simulating a football game.

BRIEF DESCRIPTION OF THE DRAWINGS

FIG. 2 is an exploded view of the electronic tabletop game device of FIG. 1.

FIG. 4 is a view of an end of the table assembly of the game device of FIG. 1 illustrating an exploded view of the hand control deck.

FIG. 11 is an illustration and diagram showing how individual LEDs are arranged to illuminate corresponding graphic clusters or cells on the tabletop playing field surface of FIG. 10.

Like reference numerals have been used to identify like elements throughout this specification.

DETAILED DESCRIPTION

Figure 1:
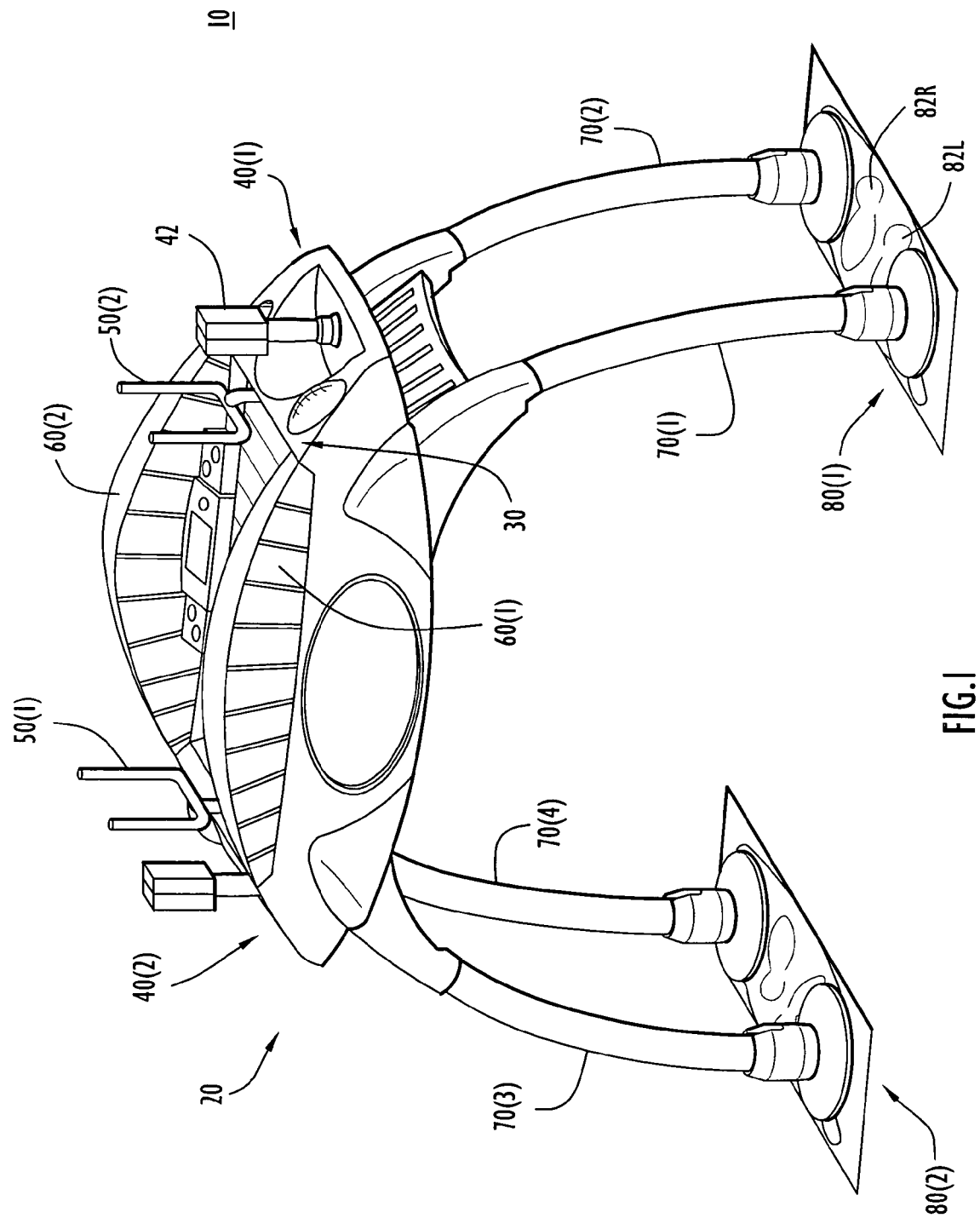
FIG. 1 is a perspective view of an electronic tabletop game device according to the present invention.

Referring first to FIGS. 1 and 2, the electronic game device according to the invention is shown generally at reference numeral 10. The game device 10 is a free-standing tabletop type of game device that combines hand control with foot control interaction for a head-to-head competition between two players that stand facing each other on opposite ends of a tabletop "playing field", or one player that stands at one end of the tabletop "playing field" against the computer. The following description refers to an electronic American football game as an exemplary embodiment of the game device 10 according to the present invention. It is to be understood that the game device 10 can be designed for any other sport or game without departing from the scope and spirit of the present invention.

The game device 10 comprises a table assembly 20 that supports a game surface, e.g., a tabletop display surface assembly 30, a first hand control deck 40(1) and a second hand control deck 40(2). Each hand control deck 40(1), 40(2) includes a joystick 42. In addition, ornamental structures may additionally be provided, which in the example shown in FIG. 1, include goal posts 50(1) and 50(2), and simulated stadium structures 60(1) and 60(2). Different types of ornamental structures may be provided for different game applications of the device 10 without departing from the scope and spirit of the present invention.

As illustrated in FIG. 1 and FIG. 2, the game device 10 is designed to stand on a floor and to this end includes leg members 70(1), 70(2), 70(3), and 70(4) that attach to corresponding leg fenders 90(1)-90(4) that are in turn attached to an undersurface of the table assembly 20. For additional support, there are leg crossbars 92 that may be attached between leg members 70(1) and 70(2), and between leg members 70(3) and 70(4). In addition, the leg members 70(1) and 70(2) attach to a first footpad 80(1) and the leg members 70(3) and 70(4) attach to a second footpad 80(2). The footpads 80(1) and 80(2) rest on a supporting surface (floor) and are designed to receive and support the feet of first and second players (not shown) respectively, who also interact with controls on the hand control decks 40(1) and 40(2), respectively. Leg base members 72(1)-72(4) are associated with the corresponding leg members 70(1)-70(4). The footpad 80(1) is assembled between the leg base members and corresponding pad retainers. For example, pad retainer 74(1) is screwed to leg base member 72(1) with the footpad 80(1) captured there between. A similar construction exists for the footpad 80(2). The various components of the game device according to the present invention may be assembled using suitable conventional fasteners (screws, bolts, etc.) and suitable conventional assembly techniques.

Figure 3A:
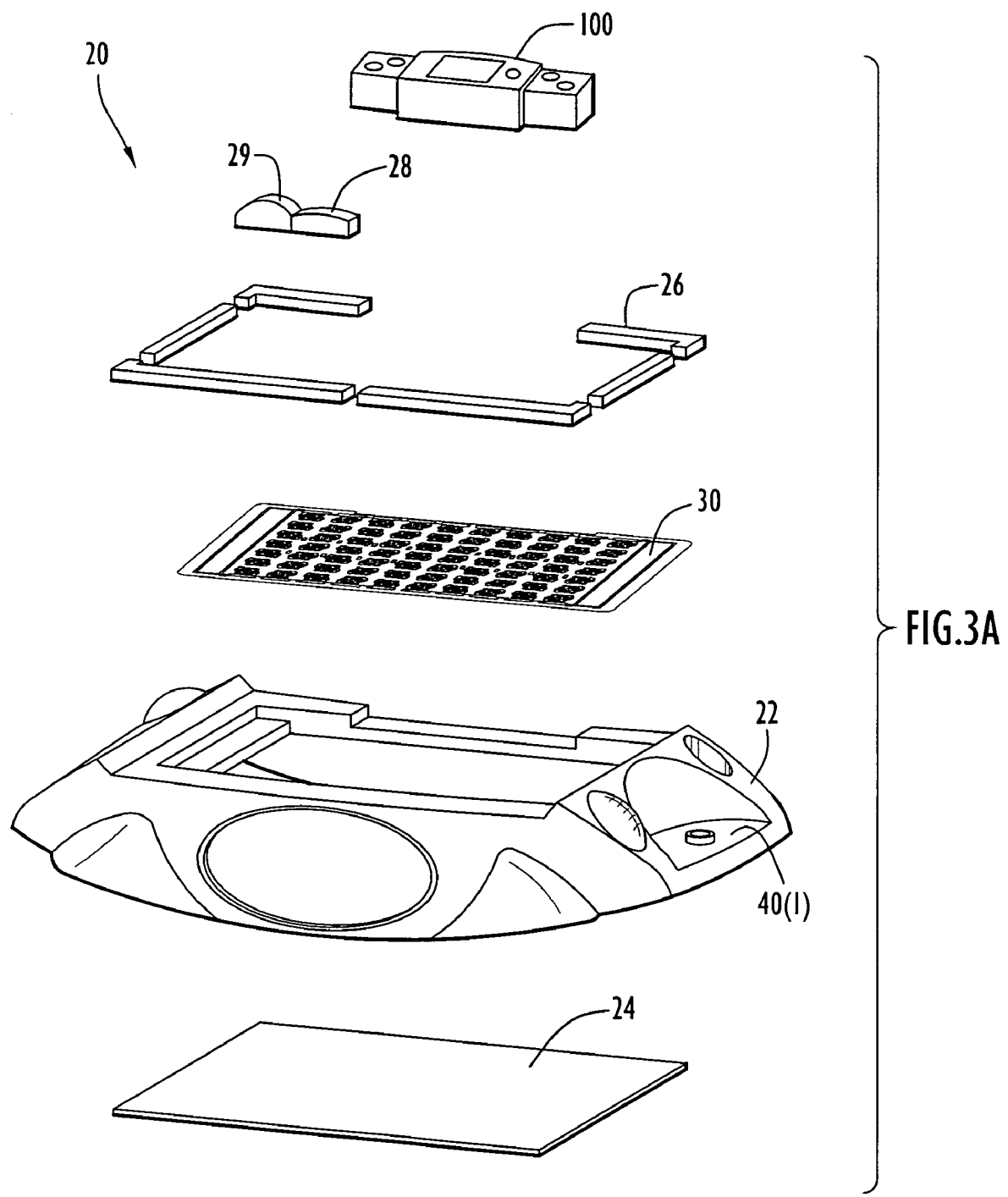
FIG. 3A is an exploded view of the table assembly of the game device of FIG. 1.
Figure 3B:
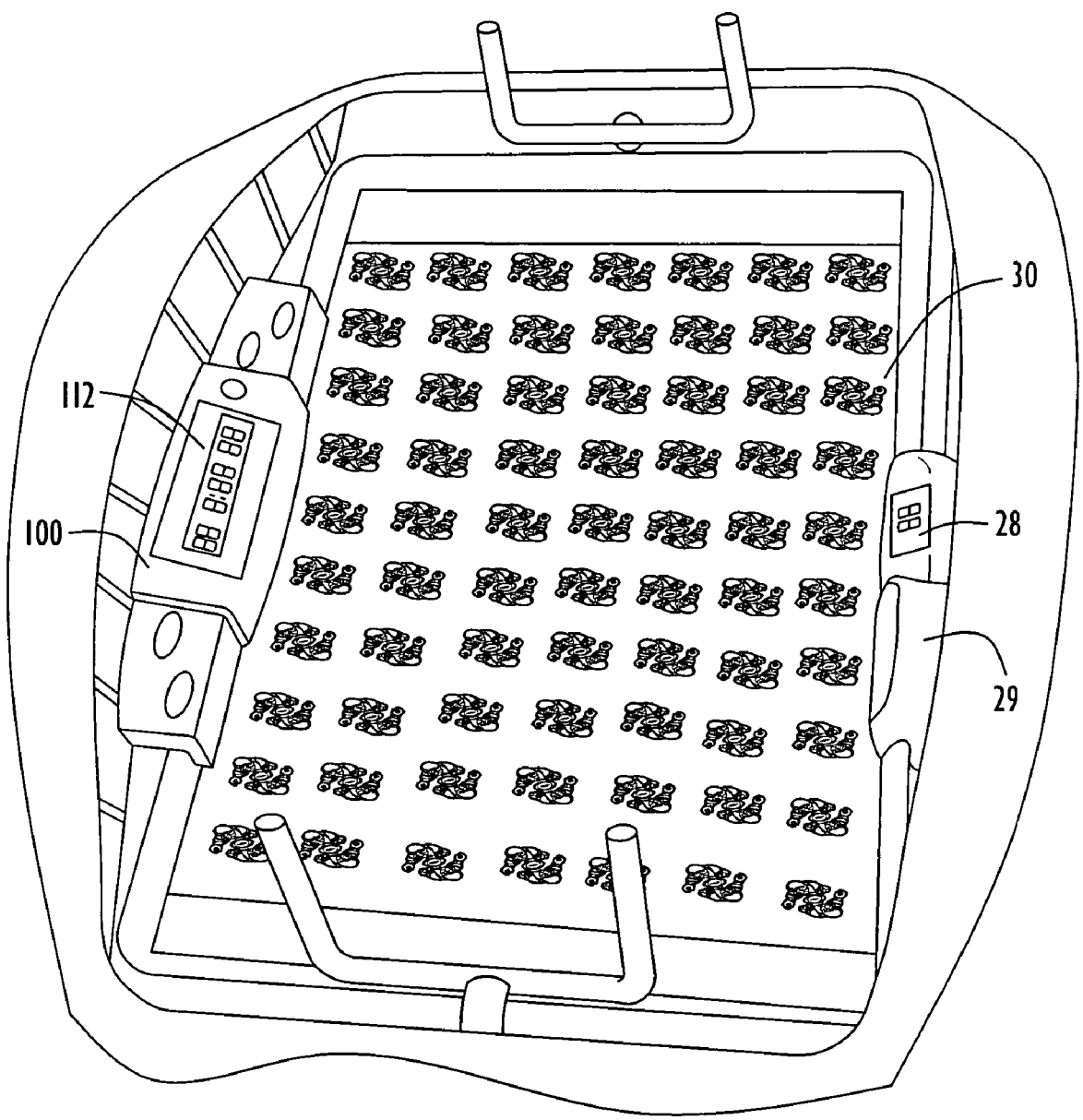
FIG. 3B is a top perspective view of the table assembly of the game device of FIG. 1.

Next, in FIGS. 3A and 3B, the table assembly 20 will be described in further detail. The table assembly 20 comprises a table frame 22 that is formed of a molded plastic of other suitable material of a shape suitable for defining areas for the hand control decks 40(1) and 40(2). In addition, the table frame 22 includes a central open area having support surfaces to support a tabletop display surface assembly 30. The tabletop display surface assembly 30 is described in further detail in conjunction with FIGS. 9-11. On the underside of the table frame 22 is an electronics cover 24 that may be formed of a corrugated plastics or press board material. On the periphery of the tabletop display surface assembly 30 are a plurality of surface retainers 26 that capture the tabletop display surface assembly 30 within the table frame 22. A main electronics unit 100 is provided that contains the majority of the electronics used to operate the game device 10, as well as an electronic scoreboard display screen 112. The scoreboard display screen 112 also serves as a menu display for viewing various game options and mode settings. The main electronics unit 100 will be described in further detail hereinafter in conjunction with FIG. 8. In addition, as best seen in FIG. 3B, there is a yardage display screen 28 (comprised of two 7-segment lighted displays beneath a clear lens along with 2 arrow displays to indicate field position)) along the table frame 22 positioned opposite from the scoreboard display screen 112 and a speaker housing 29 for an audio speaker.

Figure 5:
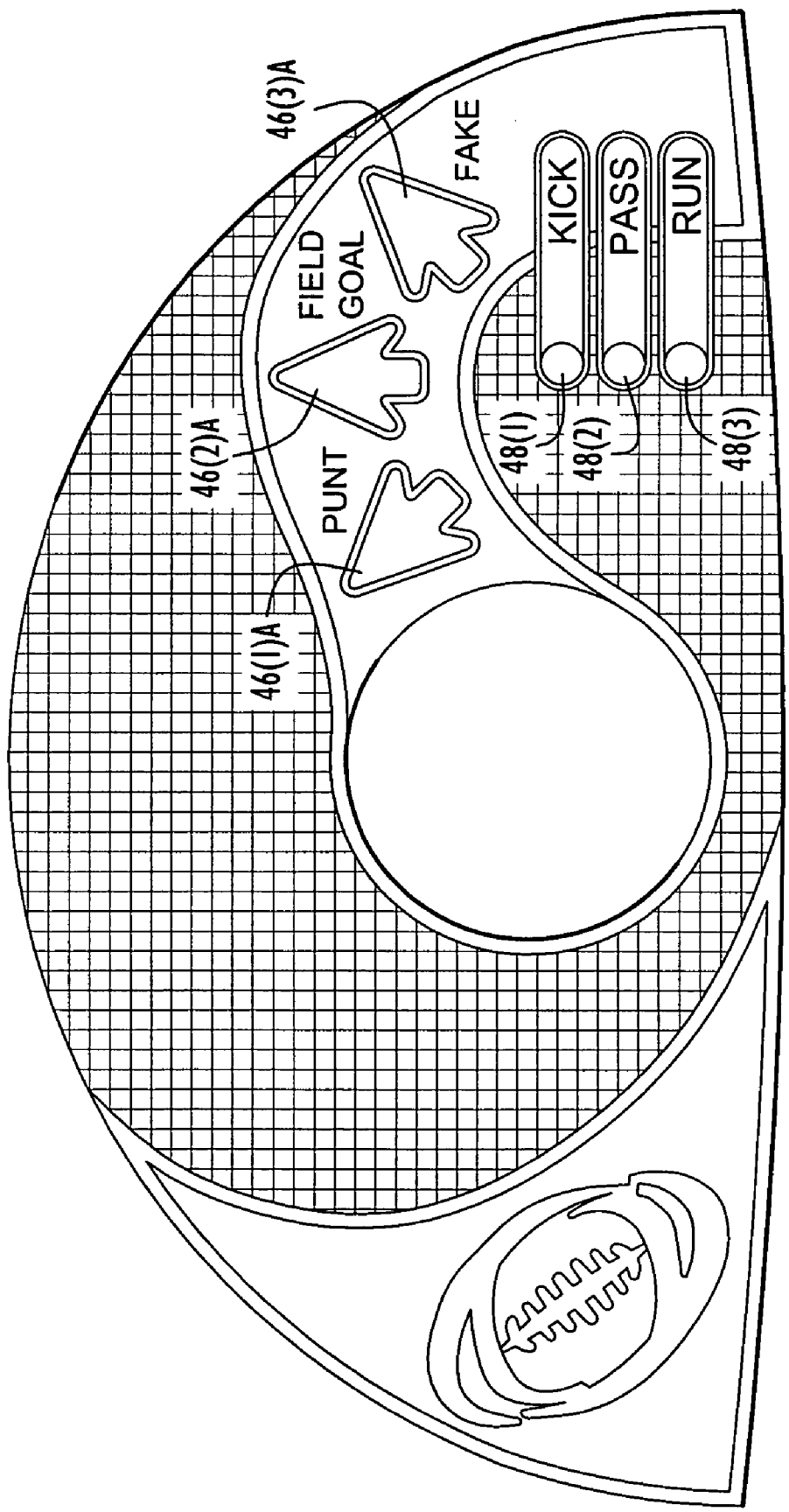
FIG. 5 is a top view of the hand control deck for the electronic tabletop game device of FIG. 1.
Figure 6:
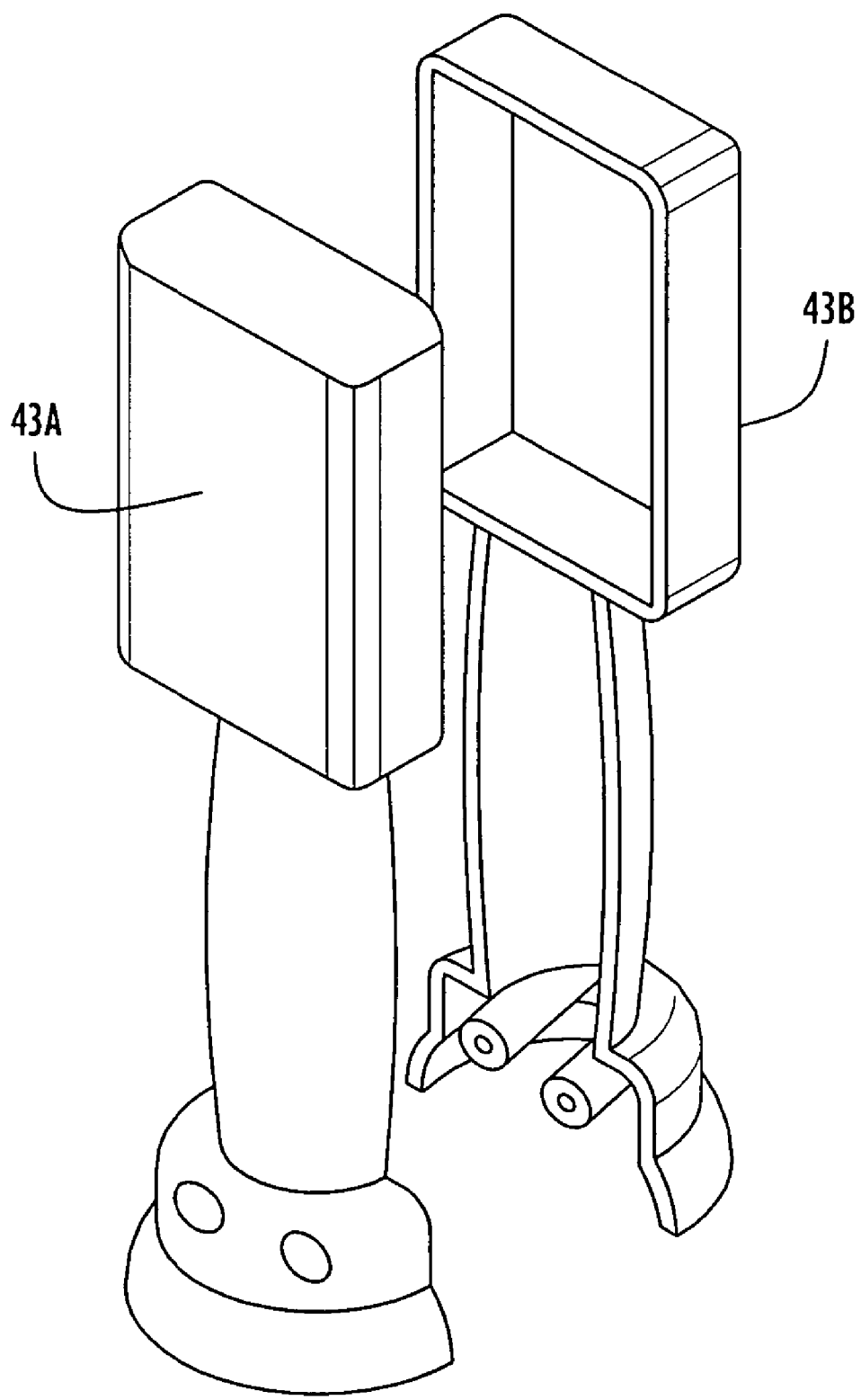
FIG. 6 is an exploded perspective view of a joystick cover figure of the game device of FIG. 1.

Turning to FIGS. 4-6, the hand control deck, e.g., hand control deck 40(1), of the table assembly 20 will be described in greater detail. Note that hand control deck 40(2) is constructed in an identical fashion to hand control deck 40(1). FIG. 5 illustrates the printed artwork for the hand control deck. 40(1) that aligns with the position of certain controls and buttons on the hand control deck 40(1). Hand control deck 40(1) includes a joystick 42, such as a 4-direction joystick to control player movement (left, right, forward and backward). A control panel cover 49 fits underneath the table frame 22 at the hand control deck location and supports the joystick 42. The joystick 42 may be made to be ornamental in appearance. In the example of an American football game, a plastic football action figure (stylized as a football player) may be provided that comprises two halves 43A and 43B (see FIG. 6) that are screwed to the joystick 42 and can be removed and changed out for another ornamental figure. These ornamental figures (joystick covers) may be separately marketed as collectible items in association with the game device 10.

FIG. 4 shows components of a so-called "football button" that is a functional button used by a player during a football game. The football button comprises a football-shaped member 44A and a compression spring 44B that fit on the outside of the table frame 22 at the circular hollowed-out area to the upper left of the table frame 22. On the underside of the table frame 22, there is a button retainer clip 44C, a button printed circuit board (PCB) 44D that contains the switch circuit that is responsive to actuation of the play button, and a retainer assembly 44E for supporting the PCB 44D. The football button serves to hike the football in order to start a play when a player is on offense. On defense and in the so-called Pro playing mode, a player may use the football button 44A while tackling a ball carrier from behind to attempt to strip the ball and cause a fumble. The fumble will be caused some percentage of the time that the football button 44A is selected. In addition, the football button 44A is used to signal when a player wants to make a pass. The football button 44A is also used as a select button when scrolling through a menu.

There are also so-called "play" buttons that are used by a player to select a particular play type during a game. The play buttons comprise play button members 46(1)A, 46(2)A, and 46(3)A in the shape of arrows (as better shown in FIG. 5). The button 46(3)A labeled "fake" in FIG. 5 may alternatively be labeled "go for it". The play button members 46(1)A-46(3)A are connected to a play button PCB 46B that contains the circuits that are responsive to actuation of the play button members 46(1)A-46(3)A. In addition, there are light elements, such as light emitting diodes (LEDs), 48(1), 48(2), and 48(3) that are illuminated depending which play button is actuated and how many times it is pressed. The play buttons are used to select "kick", "pass" and "run" plays. Game play logic for simulating and overall operation of an electronic football game is described hereinafter.

Figure 7:
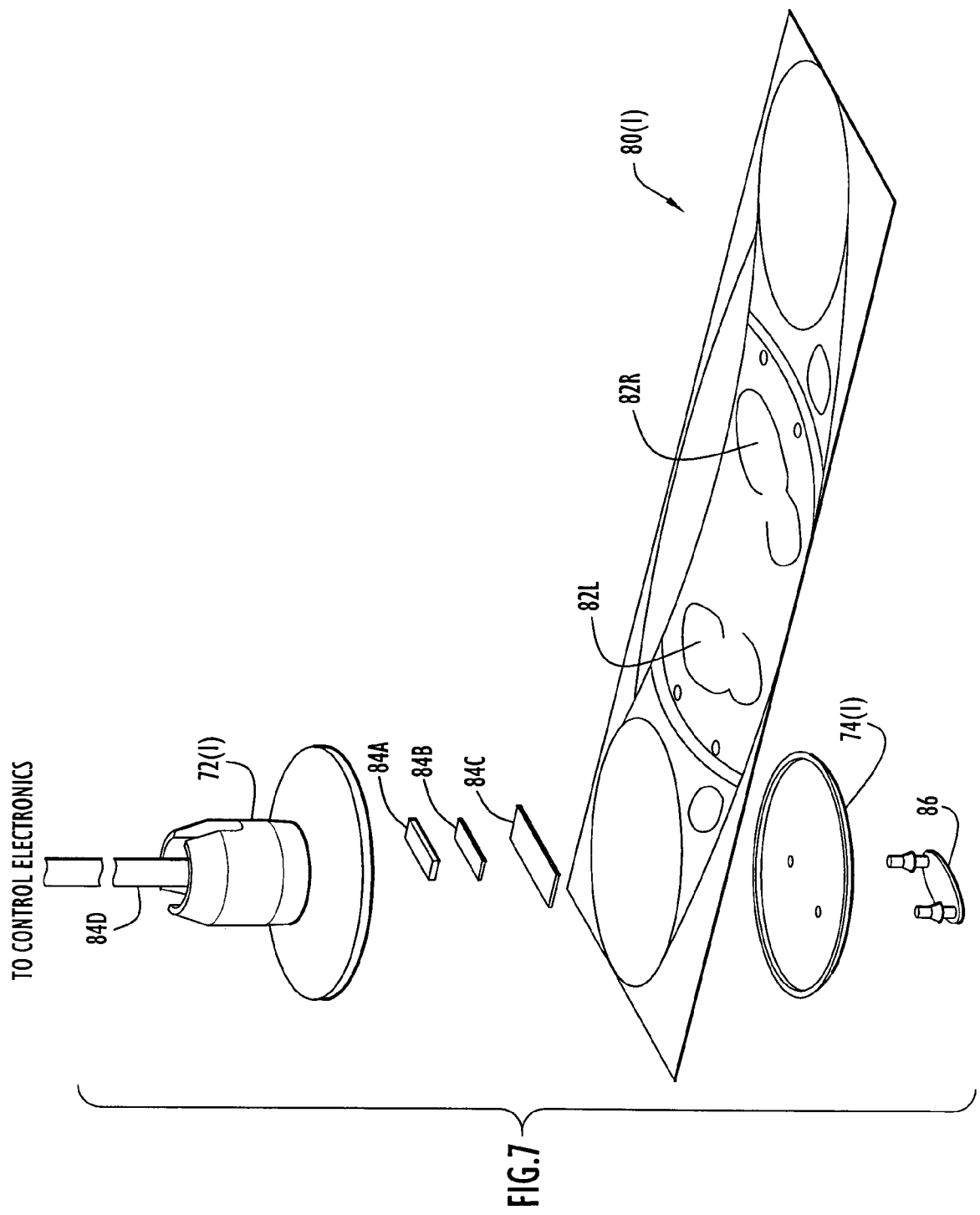
FIG. 7 is an exploded view of a footpad control surface for the electronic tabletop game device of FIG. 1.

Turning now to FIG. 7, the footpad 80(1) will be described in further detail. Footpad 80(2) is constructed in an identical fashion to footpad 80(1). The footpad 80(1) is an electronic pad that includes electronic switches shown at reference numerals 82L and 82R formed therein to respond to impact of a player's feet in a running motion. There are many possible constructions for the footpad 80(1) and the electronic switches formed therein. One suitable construction involves a printed PVC top layer, a Mylar upper layer forming a top part the electronic switches 82L and 82R, a foam separator layer, a Mylar lower layer forming a bottom part of the electronic switches 82L and 82R, a PVC bottom layer, and a border fabric. This construction is also used in the well known and commercially available "Dance Mat" technology. In order to fix the position of the electronic switches 82L and 82R, there may be a radio frequency (RF) weld forming a border around them in the footpad 80(1).

Electrical connections between the electronic switches 82L and 82R and the control electronics are made via one of the legs to the electronics housed in the table assembly 20. To this end, there is a Mylar retainer 84A, a self-adhesive foam pad 84B, and a footpad PCB 84C that houses circuitry that is responsive to actuation of the electronic switches 82L and 82R and generates suitable signals coupled by a cable 84D containing 3 conductors or wires to the control electronics. These components are secured inside of the leg base member 72(1) by screws that pass through an anti-skid foot 86 and the pad retainer 74(1), and attach to a bottom surface of the leg base 72(1).

Figure 8:
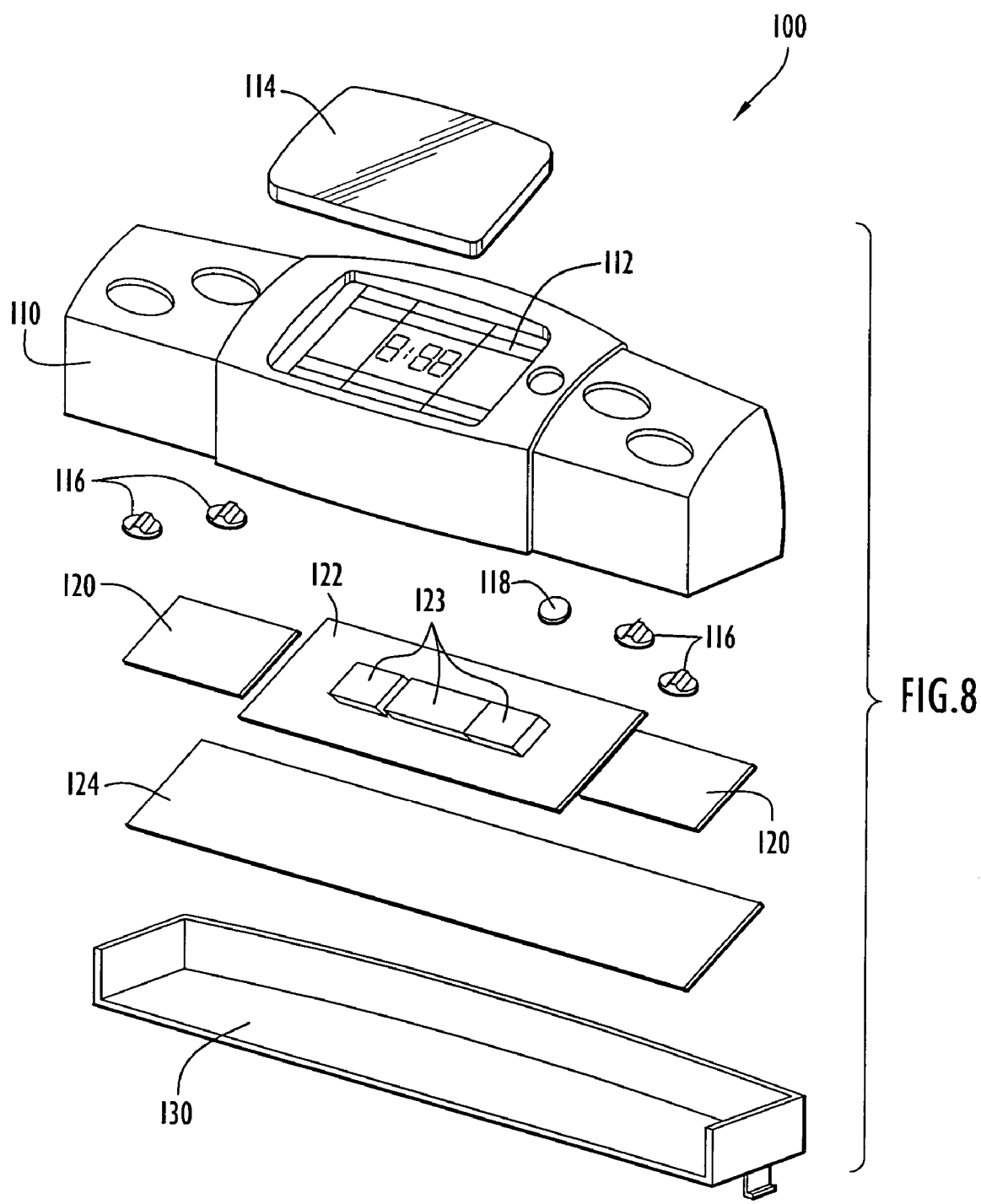
FIG. 8 is an exploded perspective view of the main electronics control housing and scoreboard display casing for the game device of FIG. 1.

Reference is now made to FIG. 8 that shows the main electronics unit 100 in greater detail. The main electronics unit 100 comprises an upper scoreboard case 110 that includes a printed scoreboard display screen 112 and a scoreboard lens 114 that fits over the scoreboard screen 112. There are four slider buttons 116 and a status button 118 that are mounted to the upper scoreboard case 110. Button PCBs 120 are screwed to a surface of the case 110 beneath the buttons 116 and 118. Similarly, a scoreboard display PCB 122 is mounted to a surface of the case 110 and a main PCB 124 is mounted beneath the display PCB 122. A lower case 130 secures to the bottom of the upper case 110 with the various PCBs 120, 122, and 124 contained in the housing formed by attaching the lower case 130 to the upper case 110. The scoreboard display PCB 122 comprises several seven segment number displays 123 to illustrate time, down, yards to go, team score, and time left in the game. The scoreboard slider buttons 116 may provide the following functions:

On/Off Slider: Turn the game on and off.
Low/High Volume Slider: Adjust the game audio volume.
One Player/Two Player Slider: Selects a one or two player game.
Training Camp/Rookie/Pro Slider: Selects the mode/level of play.

The status button 118 allows a player to toggle between display modes. There may be several display modes to display information on the LED-driven scoreboard display screen 112 related to the status of the game. Examples of the display modes are current down/yards to go, current score, and time outs remaining.

Figure 9:
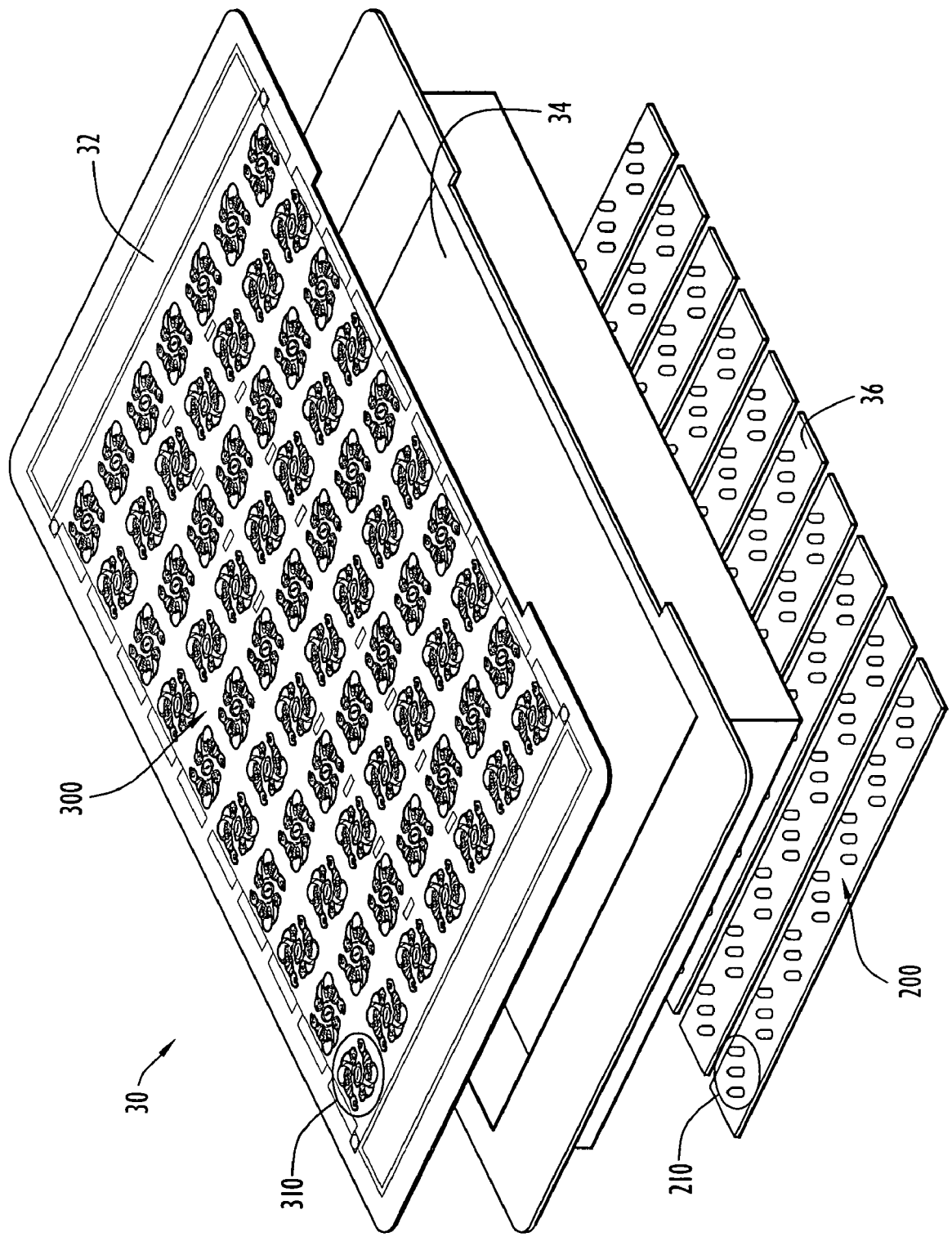
FIG. 9 is an exploded perspective view of the tabletop display surface assembly for the game device of FIG. 1.
Figure 10:
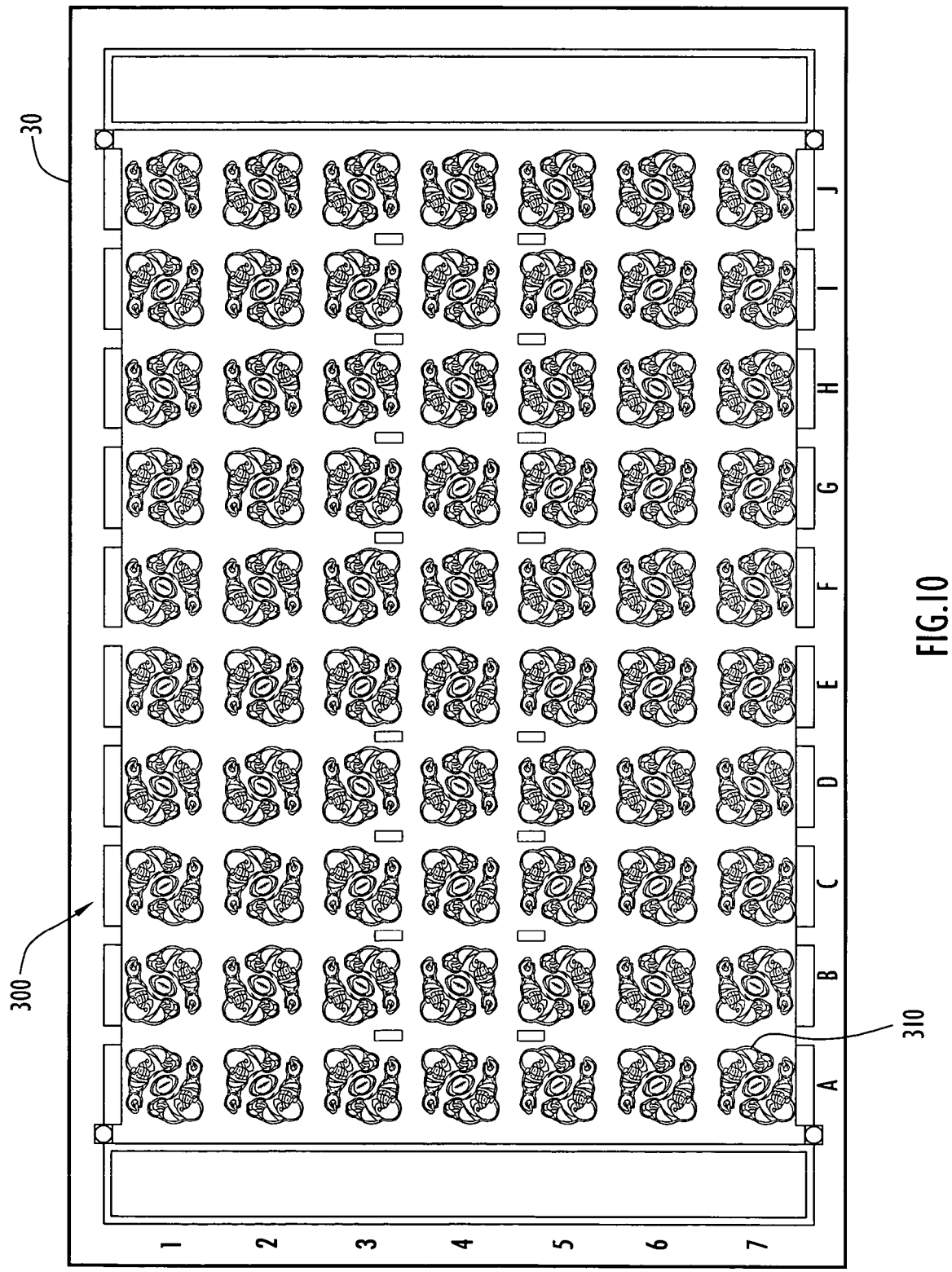
FIG. 10 is a top view of the tabletop playing field surface for an electronic tabletop football game according to one exemplary embodiment of the invention.

Turning to FIGS. 9-11, the tabletop display surface assembly 30 will be described in further detail. The tabletop display surface assembly 30 comprises a printed play surface member 32 formed out of a suitable material such as Lexan™, a table play surface support 34, and a light producing element (PCBs 36). The table play surface support 34 is formed of a translucent material. The light element PCBs 36 each support a column of light elements, such as a column of light emitting diodes (LEDs) arranged in clusters shown at reference numeral 210 as part of an array 200 of LEDs. The array 200 is also called the LED playing field array. The printed play surface member 32 is adhered to the table play surface support 34 and the light element PCBs 36. It should be understood that while FIG. 9 shows multiple light element PCBs 36 that a single PCB may be used to support all of the light elements.

In the context of an American football game, the printed play surface member 32 comprises artwork that simulates a football playing field including an array 300 of graphic character clusters or cells 310. The graphic clusters 310 are at each of a plurality of positions arranged in columns and each graphic cluster 310 overlies a corresponding LED cluster 210 comprising of light elements 220(1), 220(2), and 220(3) (see FIG. 11) in the LED array 200 on the PCB 36. As best seen in FIG. 11, in each graphic cluster 310, there is a graphic character element 312 to represent a football player for a first team, a graphic character element 314 to represent a football player for a second team and a graphical football element 316. When the light element beneath a particular graphical element 312, 314, 316 is activated, the graphical element becomes illuminated to simulate an active game character (e.g., player) or game object. LED 220(1) may be of a first color (red) to illuminate the graphic element 312 associated with the first team, LED 220(2) may be of a second color (yellow) to illuminate the graphic element 314 associated with the second team, and the LED 220(3) may be of a third color (orange) to illuminate the football graphic element 316. LEDs in the LED array 200 are sequenced on and off to represent game character (player) movement and game object (football) movement. The LED playing field array 200 is described in further detail hereinafter in conjunction with FIG. 15.

Figure 12:
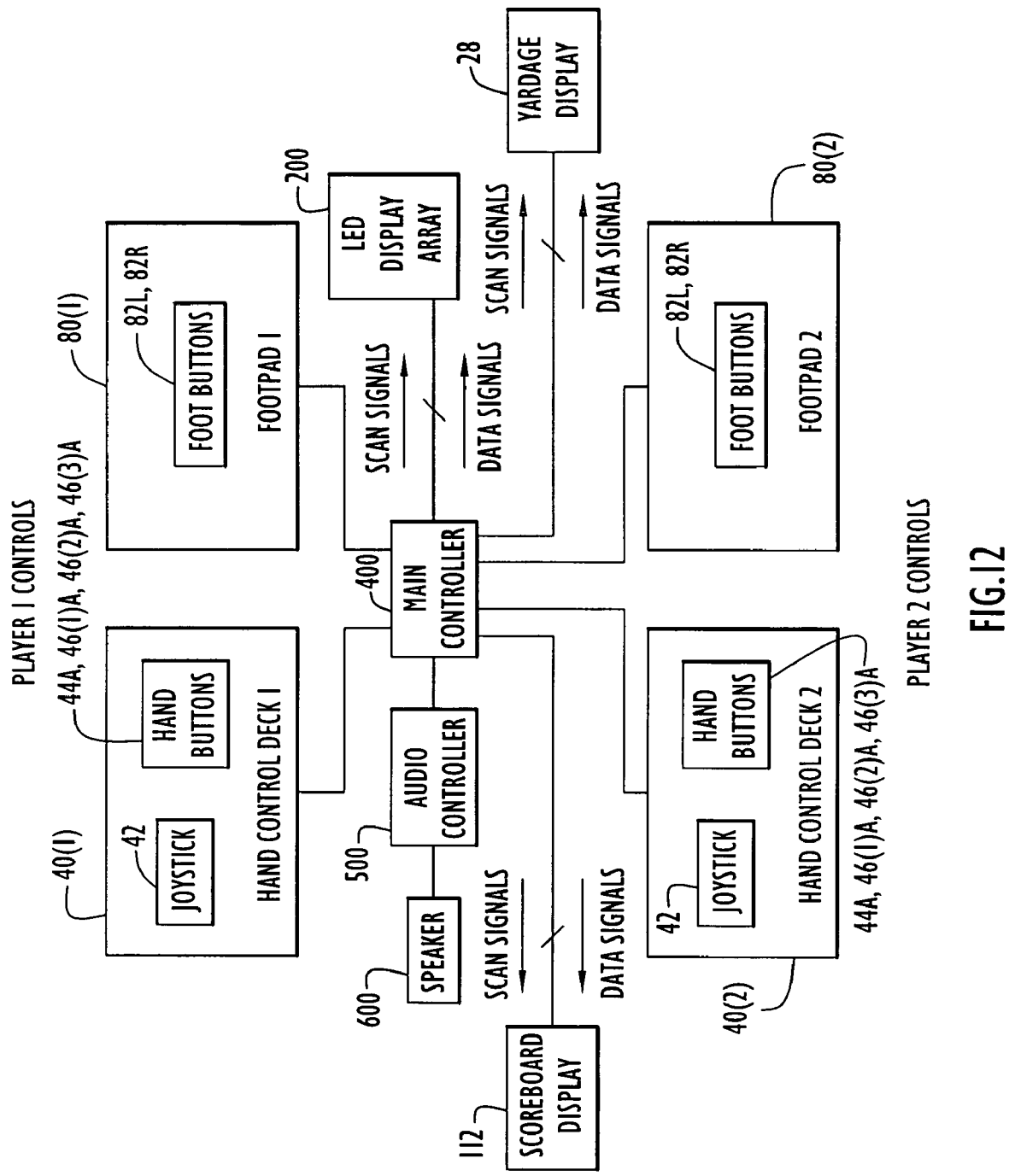
FIG. 12 is an electronic block diagram of the tabletop game device according to the present invention.

Reference is now made to FIG. 12 in which the control electronics of the game device 10 will be described. The electronic include a main controller 400 that is connected to the controls on the hand control decks 40(1) and 40(2) and to the controls on the footpads 80(1) and 80(2). The main controller 400 may be an EPG3231 microprocessor by EMC, for example. There is also an audio controller 500 connected to the main controller 400 that generates audio signals, under control of the main controller 400, to produce game sounds and other audio projected by a speaker 600. The audio controller may, for example be an EM60600 microprocessor (also made by EMC). The main controller 400 and the audio controller 500 may be mounted on the main PCB 124. A single controller may be utilized to encompass the functions of both the main controller 400 and the audio controller 500.

The main controller 400 may be programmed with firmware or software to execute the functions necessary to respond to signals from the various controls and to generate controls to activate/deactivate LEDs in the LED playing field array 200 to simulate the game actions of a particular game, such as a football game. In particular, the main controller 400 generates scan signals and data signals that are supplied to the driver circuitry associated with each of the LEDs in the LED playing field array 200 to illuminate LEDs in the various LED clusters 210, thereby simulating players moving on a playing field according to football game logic. The LED driver circuitry is described hereinafter in conjunction with FIG. 17. The main controller 400 is also connected LEDS associated with the scoreboard display screen 112 to display game status information, game mode settings and to the yardage display 28 to display current yardage of the playing field and offense ball direction.

Figure 13:
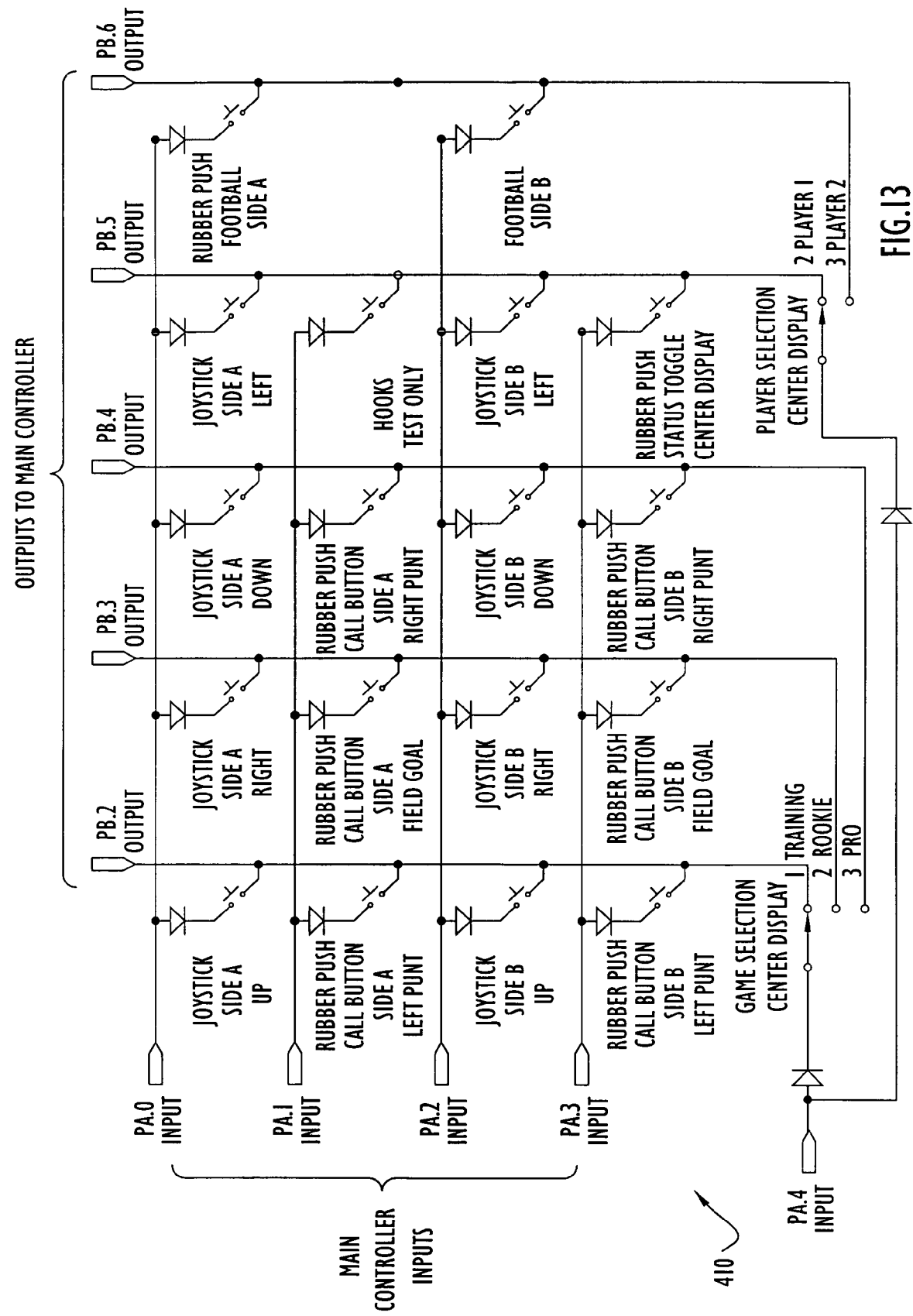
FIG. 13 is a schematic diagram of the input control matrix for the hand deck controls of the tabletop game device according to the present invention.
Figure 14:
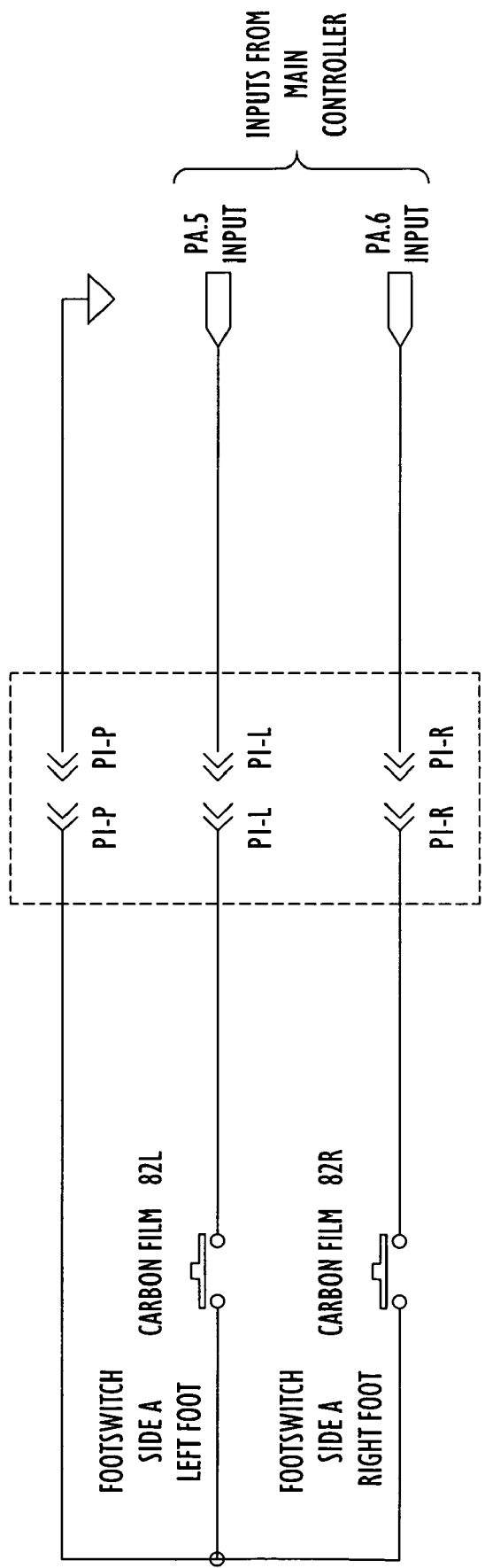
FIG. 14 is a schematic diagram of the input controls for the electronic switches on the footpad of the tabletop game device according to the present invention.

Turning to FIGS. 13 and 14, the input matrices of switches associated with the controls on the hand control decks 40(1) and 40(2) and footpads 80(1) and 80(2) will be described. FIG. 13 illustrates a 5×5 matrix 410 that represents the switches for the buttons on the hand control decks 40(1) and 40(2). The main controller 400 scans the matrix 410 with inputs PA0 to PA4 that may be normally high and receives outputs PB2-PB6 that are pulsed. The switches are triggered on a "low" activation. FIG. 14 illustrates the electronic footpad switches 82L and 82R. These switches are scanned to check their status by input signals PA5 and PA6 from the main controller 400.

Figure 15:
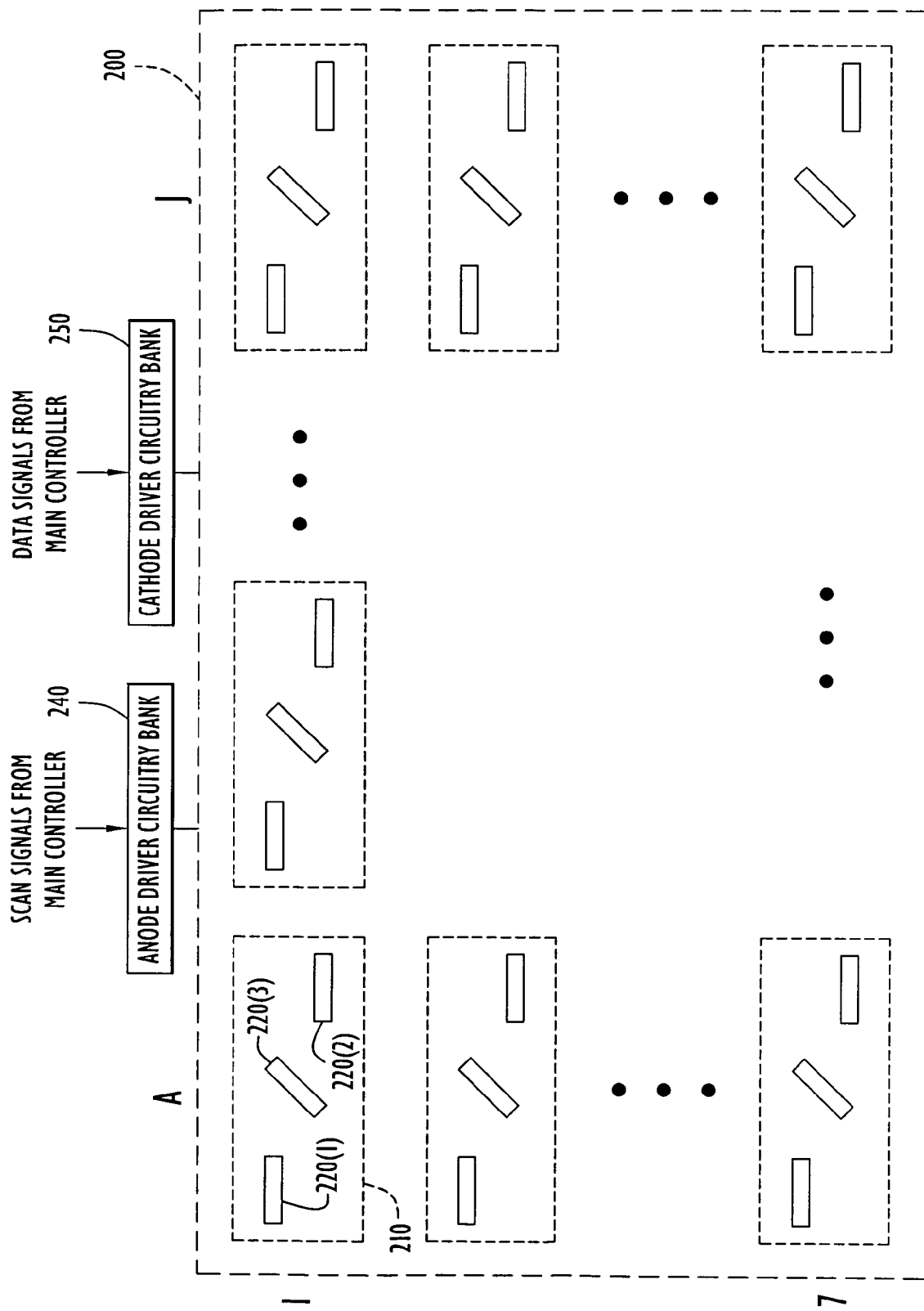
FIG. 15 is a block diagram illustrating the LED field array that forms a part of the tabletop display surface assembly illustrated in FIG. 9.
Figure 16:
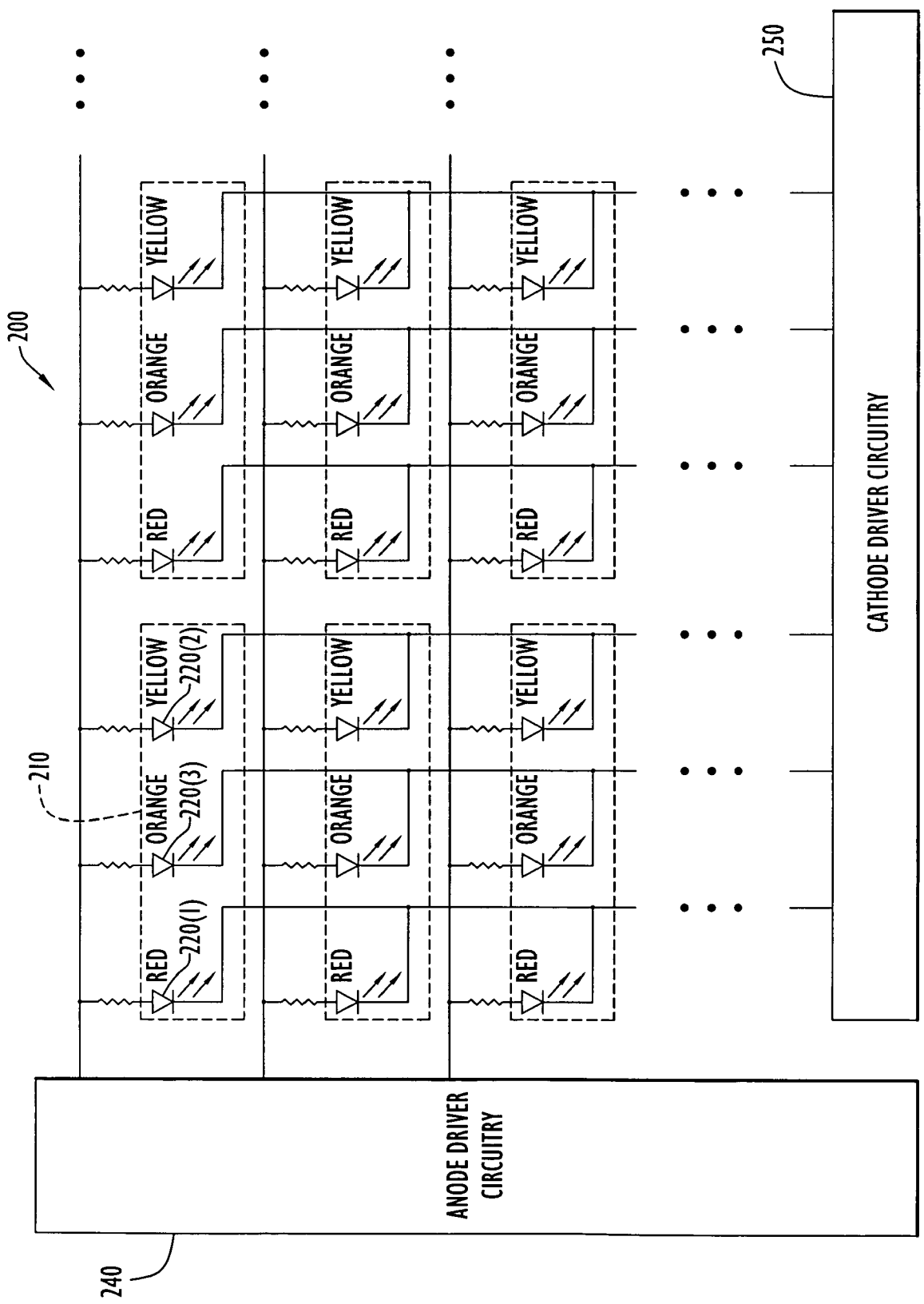
FIG. 16 is a schematic diagram of the LED field array and the associated LED driver circuitry of the tabletop game device according to the present invention.

Turning to FIGS. 15 and 16, the LED playing field array 200 is shown in greater detail. The array 200 comprises an LED cluster 210 for each graphic cluster 310 of the printed playing field shown in FIG. 10. Thus, the array 200 is a 7×10 LED cluster array, where each cluster comprises 3 LEDs 220(1), 220(2), and 220(3), for a total of 210 LEDs. In one implementation, the array 200 may consisting of a total of 216 LEDs (12×18), where only 210 LEDs are used for the playing field array. FIG. 15 illustrates the physical positions of the LED clusters 210 and FIG. 16 illustrates the physical connections to the LEDs 220(1), 220(2), and 220(3) in the array. The physical positions of the LED clusters 210 may not match the connections between LEDs. The LED clusters 210 may be grouped together and scanned as a group by the main controller 400 to account for a maximum number of LEDs that can be scanned during any given scanning interval. As explained above, the main controller 400 supplies a first plurality of signals, called scan signals, to continually refresh the LEDs in the array 200 and also supplies a second plurality of signals, called data signals, to select which LEDs are to be activated and which are not to be activated. Anode driver circuitry 240 is connected to each anode of each LED that responds to a scan signal from the main controller 400 and cathode driver circuitry 250 is connected to each cathode of each LED that responds to a data signal from the main controller 400.

Figure 17:
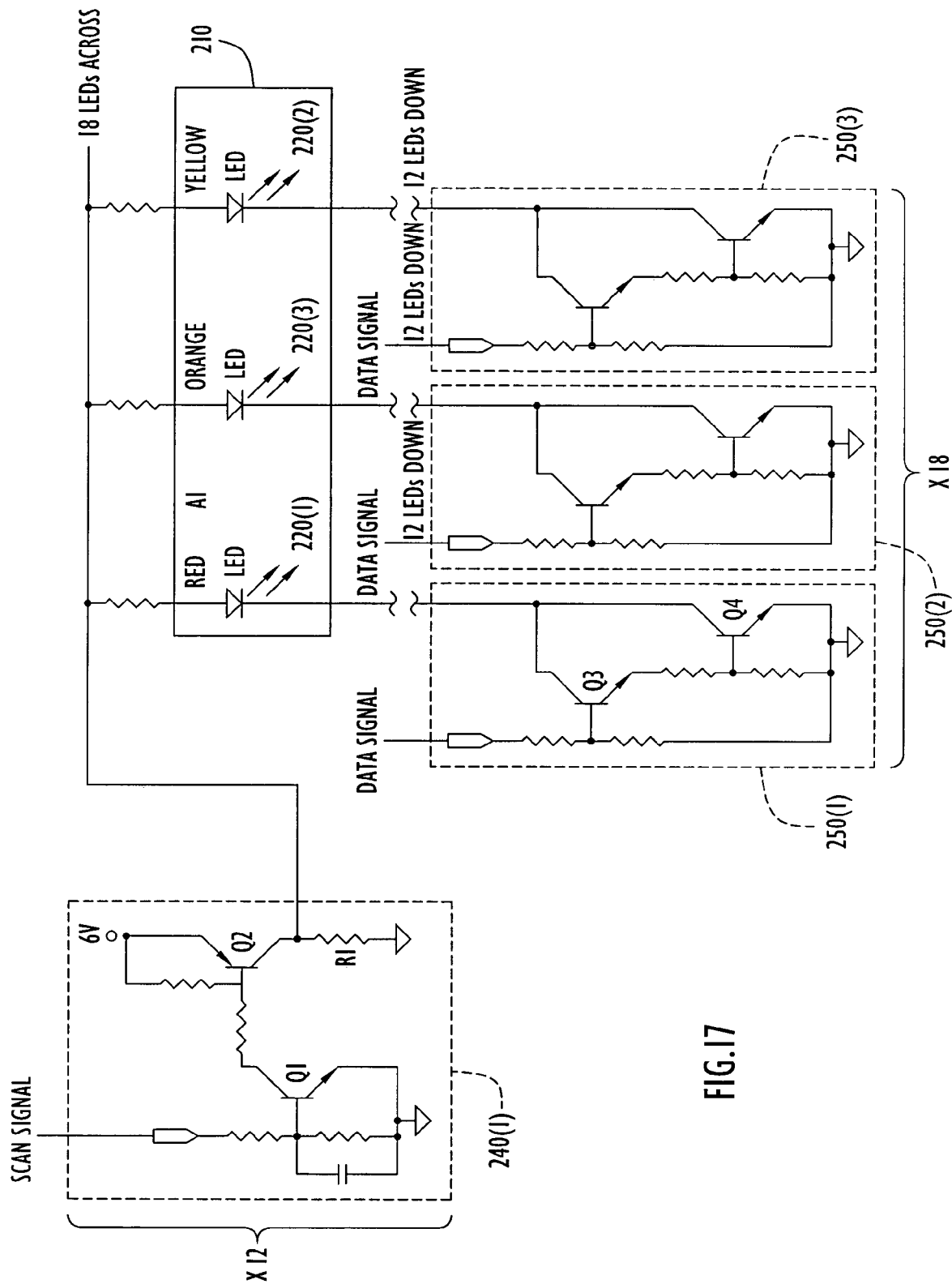
FIG. 17 is a schematic diagram of the anode and cathode driver circuitry and a single cluster of three LEDs in the LED field array of the tabletop game device according to the present invention.

FIG. 17 illustrates a single LED cluster 210 and the associated anode driver circuit 240(1) and cathode driver circuits 250(1)-250(3) connected to it. Each LED 220(1),220(2),220(3) in the LED playing field array 200 has a driver circuit connected to its anode and to its cathode. In the exemplary array shown in FIG. 16, each anode driver circuit 240 actually connects to 18 LEDs (in a row for purposes of the diagram of FIG. 16) and the cathode driver circuit 250 connects to 12 LEDs (in a column for purposes of the diagram of FIG. 16). The anode driver circuit 240 comprises transistors Q1 and Q2 connected to respond to a scan signal to supply a current to the LED necessary to activate the LED depending on the status of the cathode of that LED. The scan signal is, for example, a 60 Hz signal, 1.375 mS ON (5 μS OFF) and 15.28 mS OFF. The 5 μS OFF portion of the scan signal may be adjusted in order to allow the transistors Q1 and Q2 and LEDs to discharge before the next scan cycle begins. The resistor R1 connected in the collector of transistor Q2 is the discharge path. A scan signal is supplied to each of the anode driver circuits 240.

Each cathode driver circuit 250(1),250(2),250(3),250(n) comprises transistors Q3 and Q4 connected so as to respond to a data signal to bias the connected LED for turning it ON by making the cathode side of the LED more negative than the anode side of the LED when the data signal is present at transistor Q3. The diode will turn ON if the voltage across the diode exceeds its cut-in potential. Otherwise, when no data signal is present at the cathode of an LED, the LED will not turn ON because the cathode is kept at a potential such that the anode is not more positive than the cathode so that the voltage across the LED could not exceed its cut-in potential. The main controller 400 supplies the scan signals continuously to the anode driver circuits 240, and synchronously with the ON portion of the scan signal cycles it supplies data signals to the cathode driver circuits 250 to thereby turn ON certain LEDs to activate LEDs in order to simulate moving characters on the playing field.

To summarize the LED driver circuitry operation in accordance with the present invention, the controller 400 generates the display control signals which comprise the plurality of first signals (scan signals) supplied to the anode driver circuits 240 and the plurality of second signals (data signals) supplied to the cathode driver circuits 250. Each anode driver circuit 240 is responsive to one of the first signals to apply a first voltage to the anode of the LEDs connected thereto, and each cathode driver circuit 250 is responsive to one of the second signals to apply a second voltage to the cathode of the LEDs connected thereto while the first voltage is being applied to the anodes of the LEDs to thereby activate select ones of the LEDs in said array.

It should be understood that a different display technology may be used in the game device 10 without departing from the spirit and scope of the present invention. For example, display devices such as liquid crystal display (LCD) panels, cathode ray tube (CRT) display panels, plasma displays, and any other display technology known or hereinafter developed may be used. The advantage of the LED array display described herein is its relatively low cost (at current-day prices) as compared to other display technologies currently available.

Game Play/Flow and Device Operation Details

A description of the operation of the device 10 will be provided with reference to FIGS. 1, 2 and 3B. The device 10 is a unique electronic game table device that combines a digital electronic display and physical play with head to head game play. Game play is achieved through the use of multi-colored light up field display, and full body gross motor skill physical game controls. There may be 3 modes of game play: Training Camp, Rookie, and Pro. In the Training Camp mode, the game play is a single player vs. the computer or two players playing against each other. Training camp is useful to learn the basics of the game. For Rookie and Pro mode, the game is played as 2-player head-to-head or single player vs. the computer. Each of the modes utilizes the user's gross motor skills to control their player's actions. A player can control the player movement, make the player run, pass the football, and kick the football. To complete the experience, there is audio and visual output throughout the game, including game play commentary, real football sounds, and electronic scoring. For advanced game play the gamer has the ability to call plays and go against a quicker defense.

The simulated football playing field shows 10 yards at a time on the yardage display 28 (FIG. 3B). The yardage display 28 includes a two digit 7-segment display and two additional LEDs to illuminate arrow graphics on opposite sides of the 7-segment digits to indicate the field position of the ball. The arrows change when the ball moves past the center of the field, 0-50 and then 50-0. The playing field scrolls yardage with the LED numbers to show progress either way. Each team lines up on their side of the line of scrimmage to start the play. One of the players on each team, a so-called "main player" is controllable by a user (with the hand and foot controls). There is one main offensive player controlled by the user whose team is on offense, and one main defensive player controlled by the user whose team is on defense. The main player always flashes or blinks. The other team players are represented by illuminated player graphics on the field. Yardage is gained by completing a play that allows the offensive player to go successfully beyond the line of scrimmage. Player movement is shown by sequentially lighting up different lights with the same color and or flashing patterns.

Player Direction Control Joystick: The 4-direction joystick 42 controls the main player (offensive or defensive) movement direction (left, right, forward, and backward). The joystick is also used to navigate through the selection menus.

Hike and Pass Control: A user hits the football button 44A on the hand control deck 40(1),40(2) to signal when to hike/snap the football to start the play and to pass the football as well. To complete a pass the controlled QB needs to be lined-up with their receiver with an unobstructed path. If a defensive player is lined-up between the QB and the desired receiver and the defensive player has not crossed the line of scrimmage, the attempted pass will be intercepted some percentage of the time according to the game logic.

Running Control Footpad: Each player taps with their feet (in a walking or running rhythm) on the electronic footpad switches 82L,82R on the footpads 80(1) and 80(2) to activate a running sequence and continues that to keep up the simulated running. The footpad switches 82L,82R are also used to initiate a kick (kickoff, punt, field goal, etc.). When an offensive player runs down field, he will only progress to the sixth row on the field. At that point, the field begins "scrolling" whereby the next yard of the field comes into play, one yard at a time. The other players all move back a row unless they are also moving in the same direction. This crolling continues until a score, tackle or turnover is made.

Play Selection: Offensive and defensive player set-ups are called by pressing one of the play buttons 46(1)A to 46(3)A on the hand control decks 40(1) and 40(2). Each player's hand control deck 40(1) or 40(2) is sufficiently hidden from the view of the other player.

Figure 18:
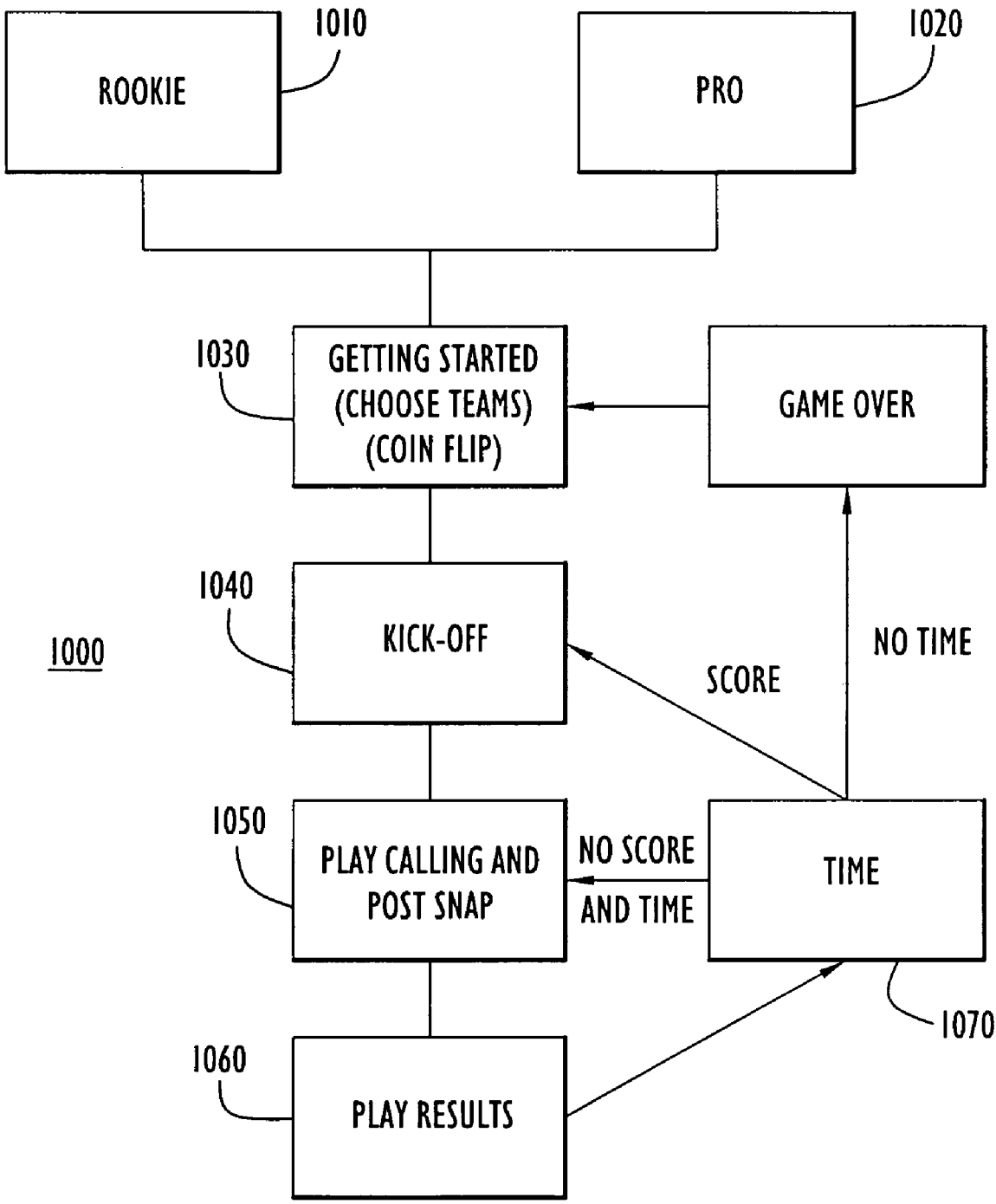
FIG. 18 is a flow chart depicting the game operational flow for an electronic football game according to an exemplary embodiment of the present invention.

Turning to FIG. 18, a high level operational flow 1000 of the device 10 in accordance with the present invention will be described. A user makes a selection between Rookie mode and Pro mode shown at reference numerals 1010 and 1020, respectively. The major difference between these modes is that on first through third downs in the Rookie mode, players do not have to call a play. In addition, in Rookie mode the speed of the computer controlled players is slower to make it easier on the players.

When powering the device 100N, the users select team names and then go to the coin flip in the so-called "Getting Started" at 1030. If two users are playing against each other, each user selects a team name, for example, the name of a professional football team or the city name of the team. Each user uses the joystick 42 to maneuver between selections displayed on the printed play surface member 32 and uses the football button 44A to select a blinking selection. Once team name selection is made and a simulated coin toss occurs the winner of the coin toss will select if they want to kick or receive, and the game flow proceeds to Kick-Off at 1040. Before each play from the line of scrimmage, each player can select the play for their team in Play Calling and Post Snap at 1050 in the Pro play mode and on $4^{th}$ down in the Rookie mode; otherwise, the game logic automatically selects plays for each time. At the completion of a play, the results are evaluated in Play Results at 1060. The main controller 400 checks the amount of time left at 1070. If the game is over the game flow reverts to Getting Started 1030. If there is time remaining and a score has occurred, the game flow goes back to Kick-Off 1040. If there is time remaining and no score has occurred, the game flow goes to Play Calling and Post Snap 1050. The main controller 400 is programmed with logic to generally follow the rules of American football, but may adapted to a game in which position players are represented by graphic characters that can occupy a finite set of positions on the playing field simulated by selectively illuminating LEDs in the LED array. Moreover, each player uses hand (40(1),40(2)) and feet controls (80(1),80(2)) to control the movement (and direction) of a main player character (on offense or defense). The main controller 400 changes positions of the other (supporting) player characters on the team based on pre-programmed game logic described hereinafter. The steps shown in FIG. 18 will now be described in greater detail.

Figure 19:
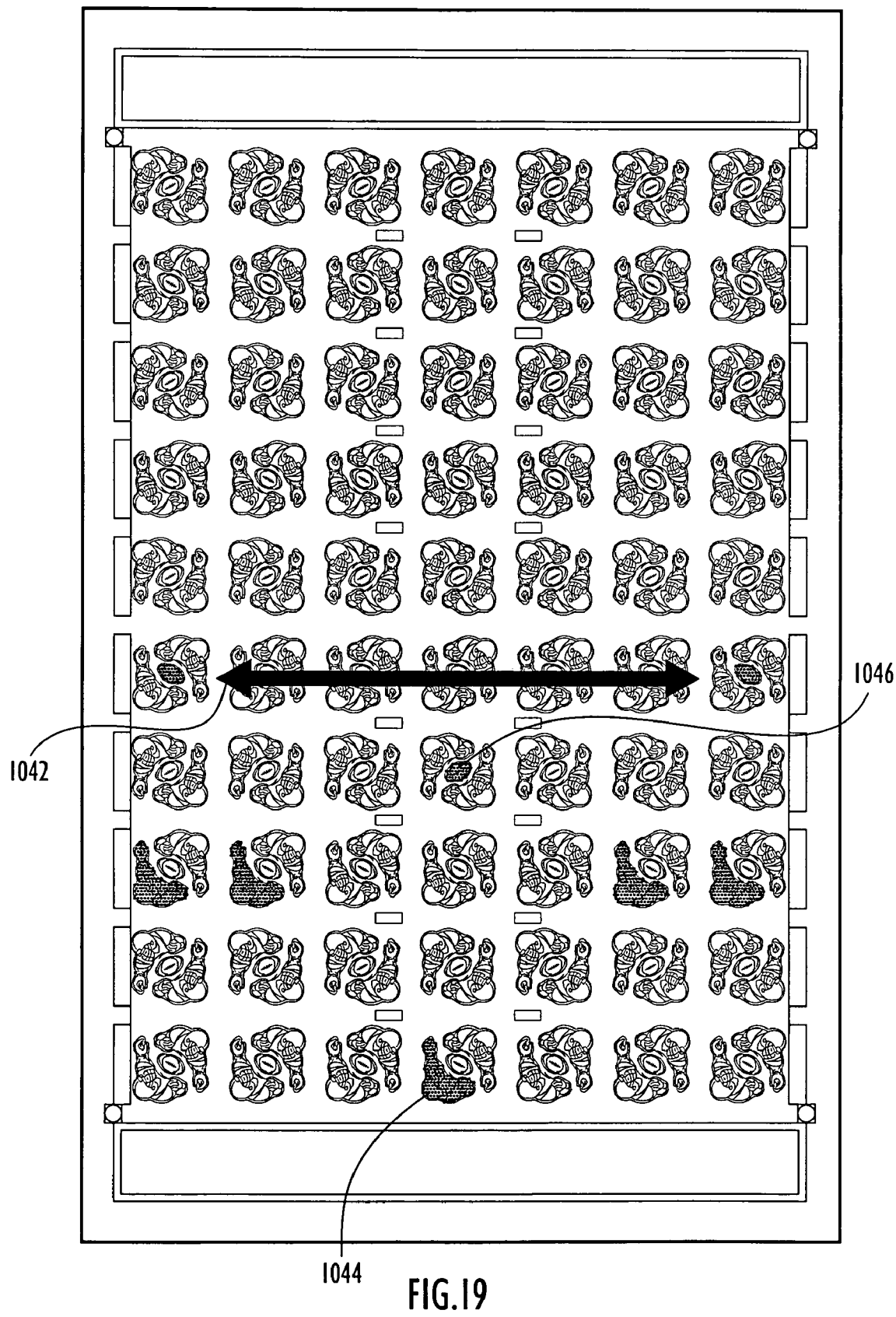
FIG. 19 is a top view of the playing field and depicting how a "kick-off" operation is performed for an electronic football game according to an exemplary embodiment of the present invention.

Kick Off: If game flow reaches the Kick-Off step 1040, one of three things has just is the beginning of the 1st or 3rd Quarters, one of the players has just scored either a touchdown or a field goal, or it is the start of Overtime. As illustrated in FIG. 19, during Kick-Off, the player for the kicking team stomps the electronic footpad switch 82L,82R to kick the ball. The player knows when to kick by watching an illuminated football graphic go back and forth across the screen as shown at reference numeral 1042. The scrolling football vanishes momentarily when the player hits the footpad switch 82L,82R and then reappears to show it getting kicked from a center point in the field. The closer the football is to the center of the field (where the football within graphic cluster 310 is lighted in position 4; where positions 1-7 are identified in FIG. 19) when the player hits the footpad switch 82L,82R, the further the kick will go. In addition, the player graphic element for the kicker shown at reference numeral 1044 is made to run up to the football (shown at 1046) to kick it. Similar logic is utilized when kicking a field goal or a punt.

TABLE 1

The length of the kick is determined by how close the strobing footballs were to the center of the field.

| Position of Strobing Footballs | Length of kick |
| --- | --- |
| 1 | 75% chance of a 20 to 40 yard kick OR 25% chance of 40 to 50 yard kick. |
| 2 | 75% chance of a 25 to 45 yard kick OR 25% chance of 45 to 55 yard kick. |
| 3 | 50% chance of a 30 to 50 yard kick OR 50% chance of 50 to 75 yard kick. |
| 4 | 50% chance of a 50 to 70 yard kick OR 50% chance of 70 to 75 yard kick (endzone) |
| 5 | 50% chance of a 30 to 50 yard kick OR 50% chance of 50 to 75 yard kick. |
| 6 | 75% chance of a 25 to 45 yard kick OR 25% chance of 45 to 55 yard kick. |
| 7 | 75% chance of a 20 to 40 yard kick OR 25% chance of 40 to 50 yard kick. |

The ball is sent down the field with the kicker and other players chasing after it. The players fall back from the football as the ball travels down field. The user will be able to tell that the ball is traveling by its motion and the "yard lines" that travel by in the scoreboard display. When the ball is ready to be caught, the opposing team's players start to appear on the field. The ball drops so that the furthest player back "catches" it. This is done automatically by the main controller 400. Once the ball carrier has the ball, the user will use the joystick controls 42 and footpad 80 to move the ball carrier. After one movement of the ball carrier, the defense will appear on the other end of the field. In the Pro mode only the user has the option to direct the blockers. The blockers will either form a wedge (middle), protect right, or protect left for the ball carrier depending upon which button (46(1)A, 46(2)A, or 46(3)A) the receiver picked before the play on kickoff. If no direction is chosen than the default is that the blocker direction is randomly chosen. In Rookie Mode the blocker direction is always randomly chosen. When the ball carrier is tacked, the main controller 400 controls the LEDs for the graphic elements for the ball 316, the ball carrier 312, and the tackler 314 to blink three times, or some other similar distinctive lighting pattern or held in an illuminated condition.

Play Calling and Post-Snap: At the end of every play in Pro mode, each player has the option to call a play for the next down using the three directional play buttons 46(1)A, 46(2)A, and 46(3)A, or if a player does not select a play, the game logic will select a play for each player. A play call button is pressed once to run, twice to pass, and three times to kick.

Blockers set up to run or pass in the chosen direction. If the user presses a button three times, he/she selects "Punt", "Field Goal" or "Fake" as is labeled on the particular button. For example, if a player wants to pass to the right, he would hit the right play call button 46(3)A twice. The first time it is selected the green Run LED 48(3) will light up (see FIG. 5). The second time it is selected the green Run LED 48(3) will turn off and the yellow Pass LED 48(2) will turn on. Touching the football/hike button 44A will break the huddle. In Rookie mode, each player may use the play calling buttons 46(1)A, 46(2)A, and 46(3)A only on fourth down. The red "Kick" LED 48(1) would light up and the user would be able to choose between "Punt", "Field Goal" or "Fake."

With reference to FIG. 10, the game logic for the various player positions, their attributes/states and their movements for team character will be described. The positions and movements are listed for the one team. The same logic is used for the other team, but with the coordinate positions flipped.

Offensive Positions
QB=Quarterback (C4; Huddle C4)
WR=Wide Receiver (E1 or E7; Huddle C4)
LT=Left Tackle (E3; Huddle B3)
C=Center (E4; Huddle C3)
RT=Right Tackle (E5; Huddle C5)
Defensive Positions
LB=Linebacker (C4; Huddle C4), but the LB can be moved before the snap.
S=Safety (A4; Huddle B5)
DLT=Defensive Left Tackle (E2; Huddle B3)
NG=Noseguard (E4; Huddle C3)
DRT=Defensive Right Tackle (E6; Huddle C5)

When left and right are referred to above, it is always the players left or right. So the Defensive Left Tackle matches up against the Offensive Right Tackle. When the ball is turned over on an interception or fumble, the offensive players become the defensive players. In other words, the QB=LB, WR=S, LT=DLT, RT=DRT, C=NG, and vise versa.

Main Players: For the offensive team, the QB is the main team player character that a user controls with the hand 40(1), 40(2) and foot controls 80(1),80(2) until or unless the ball is passed to the WR, which then becomes the main player character. For the defensive team, the LB is the main team player character that the user controls until or unless the ball comes into possession of another defensive team player character (through fumble or interception), which then becomes the main player character.

Displayed Object Attributes
Position—Location on the field.
Display State—On, Off, or Blinking.
State—The current goals and behaviors of the object.
Speed—Determined by the state.
Direction—X,Y—Determined by state.
Ball State—Bounce: The ball is thrown and "collides" with an offensive or defensive lineman (note that linemen cannot catch the ball.) It bounces off of their helmet and goes up into the air in a random direction for three our four squares (graphic clusters) and lands. It can land on the ground, or in a receiver's, safety's or linebacker's hands.
Ball State—Carried: A player is "holding" the ball. Holding means that a player is in the same cell as the ball and there is no opposing player in the cell. The ball will move to whatever cell the player moves to.
Ball State—FG: The ball travels "over" the linemen into the air. It will travel downfield depending on how well it was kicked as described above.
Ball State—Fumble: The ball moves in a random direction away from the ball carrier and tackler. It will not move into an occupied cell and will continue to move in the same general direction. Moves can be either diagonal, or straight.
Ball State—Hikes:
Hike-Standard: The ball travels from the line of scrimmage to the QB (E4→C4).
Hike-FG: The ball travels from the line of scrimmage to the cell next to the holder (E4→C4)
Hike-Punt: The ball travels from the line of scrimmage to the kicker (E4→A4)
Ball State—Kickoff: The ball travels downfield as indicated by the kick chart set forth above.
Ball State—Onside Kick: The ball travels towards the receiving team as indicated by an onside kick table (a shorter (in distance) version of Table 1—but, not reproduced herein). Ball movement is similar to that of a fumble after having traveled the required distance (10 yards).
Ball State—Passed: The ball moves from the QB in a straight line (same column) down field. If it hits the LB, S, or WR it may be, some percentage of the time, caught and carried by that ball carrier. If the ball hits the ground it is stationary. If the passed ball hits an offensive or defensive lineman, it will bounce.
Ball State—Punt: The ball travels "over" the linemen into the air. It will travel downfield as indicated by the kick table (see Table 1 above).
Ball State—Stationary: The ball does not move. It can be stationary at the beginning of a play (E4), or kickoff (D4). It can also be stationary after an incomplete pass, or an unrecovered bounce.
Ball State—Tackled: When a defender enters the same graphic cluster 310 ("cell") as the ball and ball carrier, all three objects in that graphic cluster 310 blink three times to indicate a tackle.
QB State—Block: Random block is chosen when the QB and a defender are in the same cell for a period of time determined by the play call. The QB will only block if he is not the ball carrier. This happens after he has passed the ball and the play has gone for enough time for him to block.
QB State—Goal Seeking: QB/ball carrier moves towards other team's end zone.
1. The ball carrier will move to the most open lane.
2. The ball carrier will move forward until an unblocked player is within 2 spaces, or until the lane is blocked by a blocked player. Then go to 1.
QB State—Huddle-up: QB goes from his spot at the time of the tackle to his huddle position (C4).
QB State—Kick FG: A field goal kick is activated by pressing the footpad, the QB will move (A4→C4) to kick the ball. The QB can not move in any other direction until after the ball is kicked.
QB State—Kickoff: When a kickoff is initiated by pressing the footpad, the QB will move from his stationary position to the ball and kick it. (A4→D4). The QB can not move in any other direction until after the ball is kicked.
QB State—Pass: QB throws the ball. QB is no longer in possession of the ball. If the QB is player controlled, the player will continue to control the QB until the WR catches the ball.
QB State—Punt: When kick is activated by pressing the footpad, the QB will kick the ball. The QB can not move until after the ball is kicked.
QB State—Pursue Target: If there is a fumble, the QB will take the most direct route to the ball possible.
QB State—Run Or Pass: The controller may follow pre-programmed logic for determining whether the QB should execute a run or a pass after the play begins (e.g., on first through third down in Rookie mode).

QB State—Stationary: QB is stationary at the beginning of a play before the ball is hiked (at position C4).

Wide Receiver State—Block: Random block is chosen when WR and defender are in the same cell for a period of time determined by the play call.

Wide Receiver State—Catch: If the ball is thrown, the WR will try to move to the cell within row J that the ball is being thrown to. If the ball is being thrown and the receiver is in the same column as the ball and the LB is in an adjacent column in row H, the WR will move to row H to try and avoid an interception. If the ball is thrown before the receiver reaches row J, and it enters his cell, he will still catch it. If the ball enters the cell of the WR on a pass, the WR and Ball will blink once when the catch is made. A special audio segment may also be played when a catch is completed.

Wide Receiver State—Goal Seeking: WR/ball carrier moves towards other team's end zone.
1. The ball carrier will move to the most open lane.
2. The ball carrier will move forward until an unblocked player is within 2 spaces, or until lane is blocked by a blocked player. Then go to 1.

Wide Receiver State—Huddle-up: WR goes from his spot at the time of the tackle to his huddle position (B5).

Wide Receiver State—Pass Block: Player waits for the defender to make the first move.

Wide Receiver State—Pursue Target Fumble: If there is a fumble, the WR will take the most direct route to the ball possible.

Wide Receiver State—Pursue Target Defender: If the WR is assigned a player to block, he will take the most direct route to the defender to block him. If the QB passes the line of scrimmage, the WR will pursue a defender to block him.

Wide Receiver State—Stationary: WR is stationary at the beginning of a play before the ball is hiked. The WR can be lined up on either side of the field (E1 or E7).

Wide Receiver State—Receiving Pass Left: WR moves from E1 to J1. If there is a defender in the way, the WR will find the shortest route to row J. If the defender enters into the same cell pass interference may be called. Once the WR reaches row J, he will move between cells J1, J2, J3 and J4; moving to the column with the fewest defenders. If there are two equal rows he will move to the one with the QB in it. The receiver will be blinking the entire time so that he is distinguishable from the other offensive players.

Wide Receiver State—Receiving Pass Middle: WR moves from E1 to J1, or E7 to J7 depending upon where he is lined up. If there is a defender in the way, the WR will find the shortest route to row J. If the defender enters into the same cell pass interference may be called. Once the WR reaches row J, he will move between cells J2, J3, J4, J5 and J6; moving to the column with the fewest defenders. If there are two equal rows he will move to the one with the QB in it. The receiver will be blinking the entire time so that he is distinguishable from the other offensive players.

Wide Receiver State—Receiving Pass Right: WR moves from E7 to J7. If there is a defender in the way, the WR will find the shortest route to row J. If the defender enters into the same cell pass interference may be called. Once the WR reaches row J, he will move between cells J4, J5, J6 and J7; moving to the column with the fewest defenders. If there are two equal rows he will move to the one with the QB in it. The receiver will be blinking the entire time so that he is distinguishable from the other offensive players.

Left Tackle State—Block: Occurs when the LT and a defender are in the same cell. A random block is chosen and LT and defender will remain in the same cell for a period of time determined by the play call matrix.

Left Tackle State—Goal Seeking: If the LT gets the ball on a fumble, or onside kick, he will move towards other teams end zone and function the same as the QB or a WR as described above.

Left Tackle State—Huddle-up: Goes from his spot at the time of the tackle to his huddle position.

Left Tackle State—Pass Block: Player waits for the defender to make the first move.

Left Tackle State—Pursuing a target (defender): The LT will take the shortest path possible to his assigned defender or the nearest unblocked defender. If a "blocker" or other offensive player is in the way, he will go around them. He does not move backwards, but will stay in the same row to wait for a defender who is behind the play.

Left Tackle State—Pursuing a target (ball): If the ball has been fumbled, the LT will take the shortest path possible to the ball. If a "blocker" or other offensive player is in the way, he will go around them.

Left Tackle State—Stationary: The LT is stationary before the ball is hiked.

Right Tackle and Center States: The RT and C function identically to the LT as described in detail above.

Linebacker State—Blocked: If an offensive player who is not carrying the ball or going out for a pass goes into the cell of the LB, he is blocked. An audio segment plays at random and the defensive player is stuck in that cell for a period of time determined by the blocking table (not reproduced herein). If the LB is user controlled, he can escape blocks by stepping on the footpad switches twice the number of seconds that he is supposed to be blocked according to the blocking table. So if he is supposed to be blocked for 5 seconds, 10 "steps" will free him from that block.

Linebacker State—Coverage (Covering a Receiver): LB moves in the direction of the column of the WR, but stays in row C. If the QB crosses the line of scrimmage, he will enter pursuit mode.

Linebacker State—Huddle-up: LB goes from his spot at the time of the tackle to his huddle position.

Linebacker State—Initial Movement: LB moves according to the instructions of the play call of the default (game logic-selected) play.

Linebacker State—Pursuing a Target (ball carrier): LB takes the shortest path to the ball carrier. If the ball carrier is past row B, LB's pursuit speed increases.

Linebacker State—Pursuing a Target (ball): LB takes the shortest path to the ball.

Linebacker State—Pursuing a Target (pass): If the ball is thrown, the LB moves to the column the ball is traveling in. If the LB is in the same cell as the ball without an offensive player in that cell, he intercepts the ball and becomes the offensive ball carrier in goal seeking mode.

Linebacker State—Stationary: LB is stationary before the snap (if computer controlled), or after the end of a play. A user can move the LB in the Pro and Rookie play modes.

Safety State—Blocked: If an offensive player who is not carrying the ball or going out for a pass goes into a cell with the S, the S is blocked. An audio segment is played at random and the defensive player (S) is stuck in that cell for a period of time determined by the blocking table (not reproduced herein).

Safety State—Coverage (Covering a Receiver): The S moves in the direction of the column of the WR, but stays in row A (or J dependent upon direction of offensive play). If the QB crosses the line of scrimmage, he will enter the Prevent state (described below).

Safety State—Huddle-up: Goes from his spot at the time of the tackle to his huddle position.

Safety State—Initial Movement: S moves according to the instructions of the play call.

Safety State—Prevent: The S stays in the same column as the ball carrier. When the ball carrier is in the same row, he enters the Pursuit (ball carrier) state (described below).

Safety State—Pursuing a Target (ball carrier): S takes the shortest path to the ball carrier.

Safety State—Pursuing a Target (ball): S takes the shortest path to the ball. If the ball carrier is past row B, S's pursuit speed increases.

Safety State—Pursuing a Target (pass): If the ball is thrown, the S moves to the column the ball is passing through. If the S is in the same cell as the ball without an offensive player in that cell, the S intercepts the ball and becomes the offensive ball carrier in goal seeking mode.

Safety State—Stationary: S is stationary before the snap (if computer controlled), or after the end of a play.

Right Defensive Tackle State—Blocked: If an offensive player who is not carrying the ball or going out for a pass goes into the same cell as the RDT, he is blocked. An audio segment plays at random and the defensive player is stuck in that cell for a period of time determined by the blocking table (not reproduced herein).

Right Defensive Tackle State—Huddle-up: RDT from his spot at the time of the tackle to his huddle position.

Right Defensive Tackle State—Pursuing a Target (ball carrier): RDT takes the shortest path to the ball carrier. If the ball carrier is past row B, the RDT's pursuit speed increases.

Right Defensive Tackle State—Pursuing a Target (ball): RDT takes the shortest path to the ball.

Right Defensive Tackle State—Pursuing a Target (pass): If the ball is thrown, the RDT moves to the column the ball is traveling through. If the RDT is in the same cell as the ball without an offensive player in that cell, he intercepts the ball and becomes the offensive ball carrier in goal seeking mode.

Right Defensive Tackle State—Initial Movement: RDT moves according to the instructions of the play call.

Right Defensive Tackle State—Stationary: RDT is stationary before the snap (if computer controlled), or after the end of a play.

Nose Guard and Left Defensive Tackle States: The NG and LDT function identically to the RDT as described in detail above.

Turnover—Interception: Only the LB and S defensive players can intercept a pass. If a defensive player gets in the same cell as the ball on a pass and there is no offensive player in that cell, it is an interception If the S or LB enter the cell with the WR then they may intercept as well, some percentage of the time. If the defensive player is controlled by the computer it will try to return the interception as far as it can towards the endzone. If there are players in the way, the intercepting player will try to take the shortest route around them.

Turnover—Fumble: In the Pro mode, if a defensive player is going in the same direction as the ball carrier and presses the football button 44A at the same time he enters the ball carrier's cell, there is a 40% chance that it will cause a fumble. As described above with respect to the "Ball State—Fumble," the fumbled ball can be recovered by an offensive or defensive player.

Thus, a user may utilize both the hand controls (on hand control decks 40(1),40(2)) for directional control and the foot controls (on the footpads 80(1) and 80(2)) for speed/motion to manipulate the game image on the display surface assembly 30 of the game device 10. Additionally, two player may engage one another in a head to head mode, in opposite positions across the display surface assembly 30.

While the electronic game device 10 has been described with respect to an American style football game, it is to be understood that the electronic game device concepts described herein could be used for numerous types of games in which there are two players or teams competing directly and concurrently against each other. Examples of such games include basketball, baseball, soccer, hockey, lacrosse, etc. The electronic game device 10 of the present invention could also be utilized during the play of other types of games (war games, battle games, board-type games, etc.).

The system and methods described herein may be embodied in other specific forms without departing from the spirit or essential characteristics thereof. The foregoing embodiments are therefore to be considered in all respects illustrative of the present invention and are not meant to be limiting of the scope of the invention.

What is claimed is:

1. An electronic game device, comprising:
  a. a display device that displays game characters and/or objects associated with a game in response to display control signals, wherein the display device comprises a surface member having a printed pattern thereon that simulates a playing surface for a game or activity, and a plurality of individual light emitting elements positioned beneath the surface member so as to shine light through portions of the printed pattern when selectively activated;
  b. at least first and second user positions respectively positioned on opposite sides of said display device, each user position having hand controls that are responsive to actuation by a hand of a user to produce first game control signals, and foot controls that are responsive to actuation by a foot of a user to produce second game control signals; and
  c. a controller connected to said hand controls and said foot controls at said first and second user positions and to said display device, wherein said controller is responsive to said first and second game control signals at least one of the first and second user positions to supply signals to generate said display control signals for said display device to activate and deactivate select ones of the light emitting elements for displaying movement of said game characters and/or objects in accordance with the game or activity.

2. The electronic game device of claim 1, and further comprising a footpad at said at least first and second user positions, said footpad having a surface on which said foot controls are exposed for actuation by a user's foot.

3. The electronic game device of claim 2, wherein said foot controls comprise first and second electronic switches on said footpad surface adapted to be actuated by a user's left and right foot, respectively, so as to simulate walking or running motion and wherein said controller is responsive to said second game control signals to generate said display control signals that cause the movement of a game character and/or object on said display device based on actuation of said first and second electronic switches.

4. The electronic game device of claim 2, and further comprising a tabletop support member and support legs, wherein said footpads rest on a floor surface and said support legs attach the footpads to the tabletop support member at said at least first and second user positions.

5. The electronic game device of claim 4, wherein said tabletop support member supports said display device in a substantially horizontal position between said at least first and second user positions.

6. The electronic game device of claim 5, wherein said hand controls are mounted on said tabletop support member vertically spaced above the footpad for a corresponding user position.

7. The electronic game device of claim 1, wherein said hand controls comprise at least one button and a joystick device.

8. The electronic game device of claim 1, wherein said printed pattern on said surface member comprises a graphical element at each of a plurality of positions that overly a corresponding one of the plurality of light emitting elements, wherein when the light emitting element beneath a graphical element is activated, the graphical element becomes illuminated to simulate movement of said game character and/or object.

9. The electronic game device of claim 8, wherein said printed pattern on said surface member comprises a graphic cluster at each of the plurality positions, each graphic cluster comprising first and second graphical elements, and wherein the plurality of light emitting elements comprises first and second light emitting elements of first and second colors beneath each graphic cluster, wherein the first light emitting element is arranged to illuminate the first graphical element and the second light emitting element is arranged to illuminate the second graphical element, and wherein the first graphical element is associated with a game character or player for a first team and the second graphical element is associated with a game character or player for a second team.

10. The electronic game device of claim 9, wherein said pattern further comprises a third graphical element in each graphic cluster, said third graphic element representing a game object, and wherein said plurality of light emitting elements further comprises a third light emitting element of a third color beneath each position to illuminate said third graphical element.

11. The electronic game device of claim 9, wherein said controller generates the display control signals to activate and deactivate select ones of said light emitting elements to simulate movement of said game characters and/or objects.

12. The electronic game device of claim 11, wherein said plurality of light emitting elements comprises a plurality of light emitting diodes (LEDs).

13. The electronic game device of claim 12, and further comprising a plurality of anode driver circuits, each anode driver circuit connected to anodes of a group of LEDs and a plurality of cathode driver circuits, each cathode driver circuit connected to cathodes of a group of LEDs.

14. The electronic game device of claim 13, wherein said controller generates said display control signals which comprise a plurality of first signals supplied to said anode driver circuits and a plurality of second signals supplied to select ones of said cathode driver circuits, wherein each anode driver circuit is responsive to one of said first signals to apply a first voltage to the anode of the LEDs connected thereto and each cathode driver circuit is responsive to one of said second signals to apply a second voltage to the cathode of the LEDs connected thereto while the first voltage is being applied to the anodes of the LEDs to thereby activate select ones of the LEDs.

15. The electronic game device of claim 1, wherein said controller generates display control signals to display movement of a particular game character that is part of a team of game characters, wherein said movement is based on said second game control signals produced by actuation of said foot controls in the form of walking or running motion on said foot controls by a user and based on said first game control signals produced by actuation of hand controls by a user to control movement direction of said particular game character, and said controller controls movement of other game characters in said team based on game logic.

16. An electronic game device, comprising:
a. a table assembly comprising a tabletop support member and a plurality of legs that support said tabletop support surface;
b. a display device mounted on said tabletop support member that displays game characters and/or objects associated with a game in response to display control signals, wherein the display device comprises a surface member having a pattern printed thereon that simulates a playing surface for a game or activity, and a plurality of individual light producing elements positioned beneath the surface member so as to shine light through portions of the printed pattern when selectively activated;
c. first and second user positions respectively positioned at opposite sides of the table assembly, each user position having hand controls mounted to said tabletop support member and a footpad having at least first and second electronic switches each responsive to actuation by a foot of a user, wherein the hand controls are vertically spaced above the footpad for a corresponding user position; and
d. a controller connected to said hand controls and to said at least first and second electronic switches at the first and second user positions, and responsive to actuation of said hand controls and said at least first and second electronic switches to generate the display control signals to activate and deactivate select ones of the light producing elements to illuminate the overlying printed pattern thereby simulating movement of said game characters and/or objects.

17. The electronic game device of claim 16, wherein said footpads at said first and second user positions are attached to one or more of said plurality of legs and rest on a floor surface.

18. The electronic game device of claim 16, wherein said at least first and second electronic switches are adapted to be actuated by a user's left and right foot, respectively, so as to simulate running motion and wherein said controller is responsive to actuation of said at least first and second electronic switches to generate display control signals that cause the movement of a game character and/or objects on said display device.

19. The electronic game device of claim 16, wherein said printed pattern on said screen comprises a graphic cluster at each of a plurality of positions, each graphic cluster comprising first and second graphical elements, and wherein said plurality of light producing elements comprises first and second light producing elements of first and second colors beneath each graphic cluster, wherein said first light producing element is arranged to illuminate a first graphical element and said second light producing element is arranged to illuminate a second graphical element, and wherein said first graphical element is associated with a game character or player for a first team and said second graphical element is associated with a game character or player for a second team.

20. The electronic game device of claim 19, wherein said printed pattern further comprises a third graphical element in each graphic cluster, said third graphical element representing a game object, and wherein said plurality of light producing elements further comprises a third light producing element of a third color beneath each position to illuminate said third graphical element.

21. The electronic game device of claim 16, wherein said plurality of light producing elements comprises a plurality of light emitting diodes (LEDs), and further comprising a plurality of anode driver circuits, each anode driver circuit connected to anodes of a group of LEDs in said array of LEDs and a plurality of cathode driver circuits, each cathode driver circuit connected to cathodes of a group of LEDs in said array of LEDs.

22. The electronic game device of claim 21, wherein said controller generates said display control signals which comprise a plurality of first signals supplied to said anode driver circuits and a plurality of second signals supplied to select ones of said cathode driver circuits, wherein each anode driver circuit is responsive to one of said first signals to apply a first voltage to the anode of the LEDs connected thereto and each cathode driver circuit is responsive to one of said second signals to apply a second voltage to the cathode of the LEDs connected thereto while said first voltage is being applied to the anodes of the LEDs to thereby activate select ones of the LEDs.

23. The electronic game device of claim 16, wherein said controller generates display control signals to display movement of a particular game character that is part of a team of game characters, wherein said movement is based on said at least first and second electronic switches in said footpad in the form of walking or running motion on said footpad by a user and based on actuation of hand controls by a user to control movement direction of said particular game character, and said controller controls movement of other game characters in said team based on game logic.

* * * * *

UNITED STATES PATENT AND TRADEMARK OFFICE
CERTIFICATE OF CORRECTION

PATENT NO.         : 7,578,505 B2
APPLICATION NO.    : 11/338899
DATED              : August 25, 2009
INVENTOR(S)        : Mcilvain et al.

It is certified that error appears in the above-identified patent and that said Letters Patent is hereby corrected as shown below:

Column 9, line 67, after "just" insert --happened. It--.

Signed and Sealed this

Tenth Day of November, 2009

David J. Kappos
*Director of the United States Patent and Trademark Office*